US012790747B2

(12) United States Patent
Usui

(10) Patent No.: US 12,790,747 B2
(45) Date of Patent: Nov. 10, 2026

(54) PRINTING METHOD AND PRINTING DEVICE

(71) Applicant: SEIKO EPSON CORPORATION, Tokyo (JP)

(72) Inventor: Masaya Usui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 19/000,762

(22) Filed: Dec. 24, 2024

(65) Prior Publication Data

US 2025/0215641 A1 Jul. 3, 2025

(30) Foreign Application Priority Data

Dec. 27, 2023 (JP) ................................ 2023-220194

(51) Int. Cl.

| | |
|---|---|
| ***D06P 5/30*** | (2006.01) |
| ***B41J 2/005*** | (2006.01) |
| ***B41J 2/21*** | (2006.01) |
| ***B41J 3/407*** | (2006.01) |
| ***B41J 11/00*** | (2006.01) |
| ***D06P 5/24*** | (2006.01) |
| *B41J 2/01* | (2006.01) |

(52) U.S. Cl.

CPC .............. *D06P 5/30* (2013.01); *B41J 2/0057* (2013.01); *B41J 2/2114* (2013.01); *B41J 3/4078* (2013.01); *B41J 11/0015* (2013.01); *D06P 5/009* (2013.01); *B41J 2002/012* (2013.01)

(58) Field of Classification Search

CPC ..... B41J 2/2117; B41J 2/21; B41J 3/54; B41J 3/4075; B41J 3/4076; B41J 3/4078; B41F 16/00

See application file for complete search history.

(56) References Cited

U.S. PATENT DOCUMENTS

| | | | | |
|---|---|---|---|---|
| 2013/0224447 A1* | 8/2013 | Ohashi | .................. | D06M 11/83 428/196 |
| 2020/0223229 A1* | 7/2020 | Murai | ........................ | B41J 2/07 |

FOREIGN PATENT DOCUMENTS

| | | |
|---|---|---|
| JP | 2014-104595 A | 6/2014 |
| JP | 2023-087372 A | 6/2023 |

* cited by examiner

*Primary Examiner* — Kristal Feggins
(74) *Attorney, Agent, or Firm* — Spencer Fane LLP

(57) ABSTRACT

A printing method includes an image forming step that forms an image on a transfer medium by ejecting colored ink from a first inkjet head, and an undercoat forming step in which undercoat ink is overlaid on the image on the transfer medium by ejecting undercoat ink from a second inkjet head, wherein assuming that a region where an adhesive is applied to the transfer medium at the same timing in an adhesive application step is a process unit region, the process unit region includes a first region and a second region where the undercoat ink is overlaid on the image after the first region, and in the undercoat forming step, an ejection amount of the undercoat ink per unit area to the second region is less than an ejection amount of the undercoat ink per unit area to the first region.

9 Claims, 15 Drawing Sheets

T1

A11 A12

| Ai | αi | |
|---|---|---|
| | SMALL AREA | LARGE AREA |
| A1 | 1. 2 | 1. 1 |
| A3 | 1. 0 | 0. 9 |
| A2 | 0. 8 | 0. 7 |

THA

FIG. 14

| EJECTION AMOUNT OF W | NUMBER OF PASSES NP |
|---|---|
| 0%≦DT≦20% | 2 |
| 20%<DT≦40% | 4 |
| 40%<DT≦60% | 6 |
| 60%<DT≦80% | 8 |
| 80%<DT≦100% | 10 |

PRINTING METHOD AND PRINTING DEVICE

The present application is based on, and claims priority from JP Application Serial Number 2023-220194, filed Dec. 27, 2023, the disclosure of which is hereby incorporated by reference herein in its entirety.

BACKGROUND

1. Technical Field

The present disclosure relates to a printing method for printing on a transfer medium and a printing device.

2. Related Art

As disclosed in JP-A-2014-104595, a method is known for printing on cloth using a transfer sheet as a transfer medium. This printing method includes a step for printing first image data on a transfer sheet using black toner and color toner, a step for generating second image data by processing all colors in the print region of the first image data into black, a step for printing the second image data on the transfer sheet on which the first image data has been printed using white toner instead of black toner, a step for applying adhesive to an uppermost layer of the printed transfer sheet, a step for bonding the transfer sheet to which the adhesive has been applied together with cloth and pressing the cloth while heating, and a step for peeling off a base material of the transfer sheet.

When an image to be transferred to cloth as a transfer target medium is formed using an inkjet printer, it is possible to transfer the image to the cloth by applying powdered hot melt adhesive on the image that was formed by the ink ejected on the transfer sheet. For example, by forming an image of colored ink on the transfer sheet, overlaying white ink on the image, applying the powdered hot melt adhesive on the white ink, and then attaching the heated hot melt adhesive to the cloth, it is possible to transfer the image on the transfer sheet to the cloth. When the white ink lands on the image on the transfer sheet, it gradually dries. In a print region on the transfer sheet, the later the white ink lands, the less dry the white ink is. Therefore, if the transfer sheet is tilted in order to apply the powdered hot melt adhesive or the like, white ink that has not dried sufficiently may drip downward. If the white ink drips downward, the image to be transferred will bleed.

SUMMARY

The printing method of the present disclosure includes a printing method for printing on a transfer medium in order to perform an adhesive application step for applying an adhesive on undercoat ink that was overlaid on an image that was formed on the transfer medium, and to perform a transfer step for transferring the image to a transfer target medium by attaching the adhesive to the transfer target medium, an image forming step that forms the image on the transfer medium by ejecting colored ink from a first inkjet head; and an undercoat forming step in which the undercoat ink is overlaid on the image on the transfer medium by ejecting the undercoat ink from a second inkjet head, wherein assuming that a region where the adhesive is applied to the transfer medium at the same timing in the adhesive application step is a process unit region, the process unit region includes a first region and a second region where the undercoat ink is overlaid on the image after the first region, and in the undercoat forming step, an ejection amount of the undercoat ink per unit area to the second region is less than an ejection amount of the undercoat ink per unit area to the first region.

A printing device of the present disclosure is a printing device that prints on a transfer medium in order to perform an adhesive application step, in which an adhesive is applied on undercoat ink that was layered on an image formed on the transfer medium, and a transfer step for transferring the image to a transfer target medium by attaching the adhesive to the transfer target medium, the printing device includes a first inkjet head that ejects colored ink; a second inkjet head that ejects the undercoat ink; a drive section configured to move the second inkjet head in a first direction relative to the transfer medium; and a control section that controls ejection of the colored ink from the first inkjet head, ejection of the undercoat ink from the second inkjet head, and the drive section, wherein the control section performs control to form the image on the transfer medium with the colored ink ejected from the first inkjet head, and to overlay the undercoat ink ejected from the second inkjet head on the image, assuming that a region where the adhesive is applied to the transfer medium at the same timing in the adhesive application step is a process unit region, the process unit region includes a first region and a second region where the undercoat ink is overlaid on the image after the first region, and the control section causes the ejection amount of the undercoat ink per unit area with respect to the second region to be less than the ejection amount of the undercoat ink per unit area with respect to the first region.

BRIEF DESCRIPTION OF THE DRAWINGS

FIG. 14 is a diagram schematically showing an example of a structure of the coefficient table.

DESCRIPTION OF EMBODIMENTS

Figure 1:
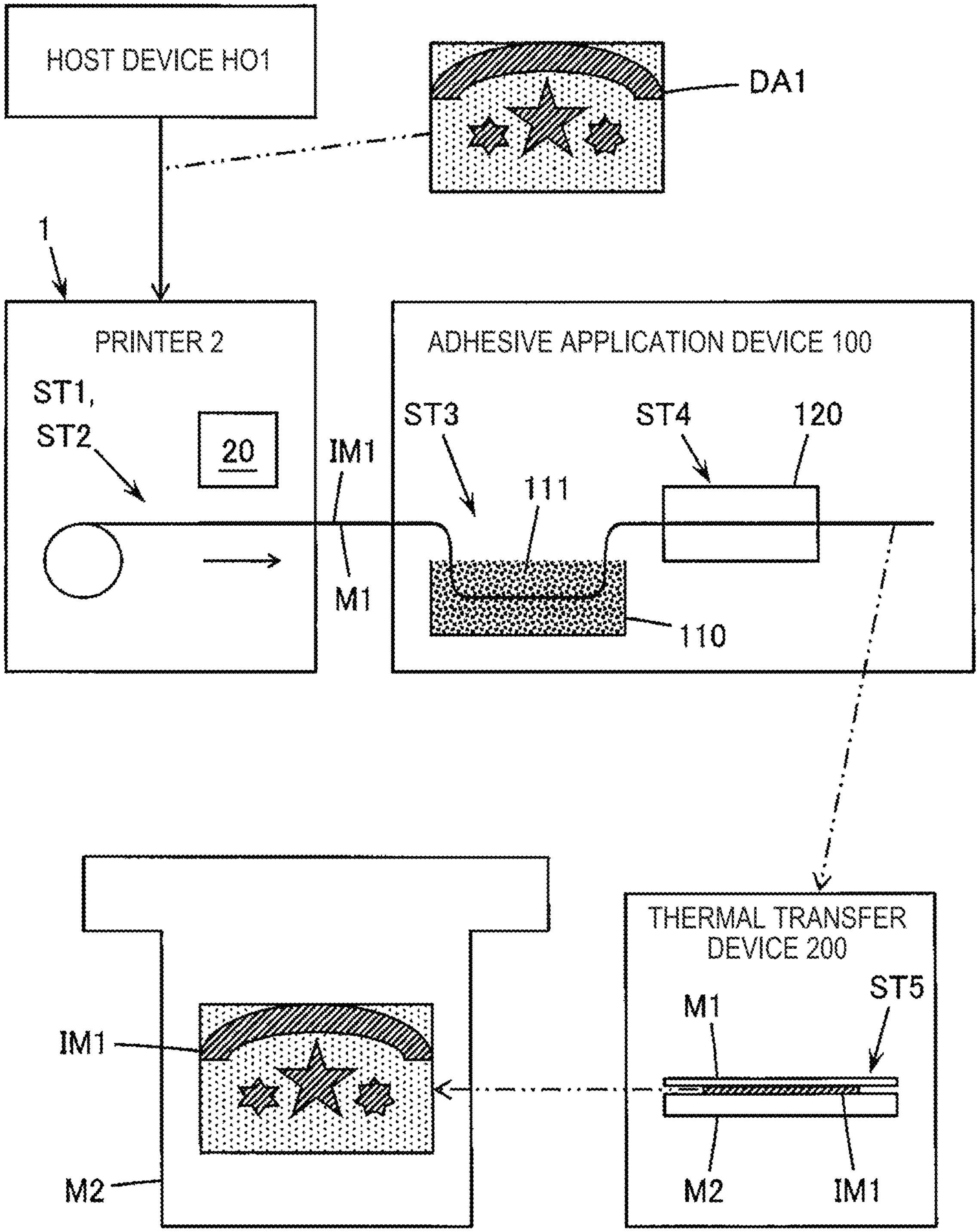
FIG. 1 is a diagram schematically showing an example of a configuration of a printing system.

Hereinafter, embodiments of the present disclosure will be described. The following embodiment is merely an example of the present disclosure, and not all of the features shown in the embodiment are necessarily essential to solve the disclosure.

1. OVERVIEW OF ASPECTS INCLUDED IN THE PRESENT DISCLOSURE

First, the general outline of aspects included in the present disclosure will be explained with reference to the examples shown in FIGS. 1 to 15. Note that the figures in this application are schematic diagrams that show examples, and the scale of each part of these diagrams may differ from the actual scale in order to make each part of these diagrams large enough to be recognizable, and the magnification ratio in the directions shown in these diagrams may differ, and the diagrams may not be consistent. Of course, each element of these aspects is not limited to the specific examples indicated by reference numerals. In the "Overview of aspects included in the present disclosure," the text in parentheses is a supplementary explanation of the preceding word. In this application, the numerical range "Min to Max" means a value that is equal to or greater than the minimum value Min and that is equal to or less than the maximum value Max.

Aspect 1

Figure 5:
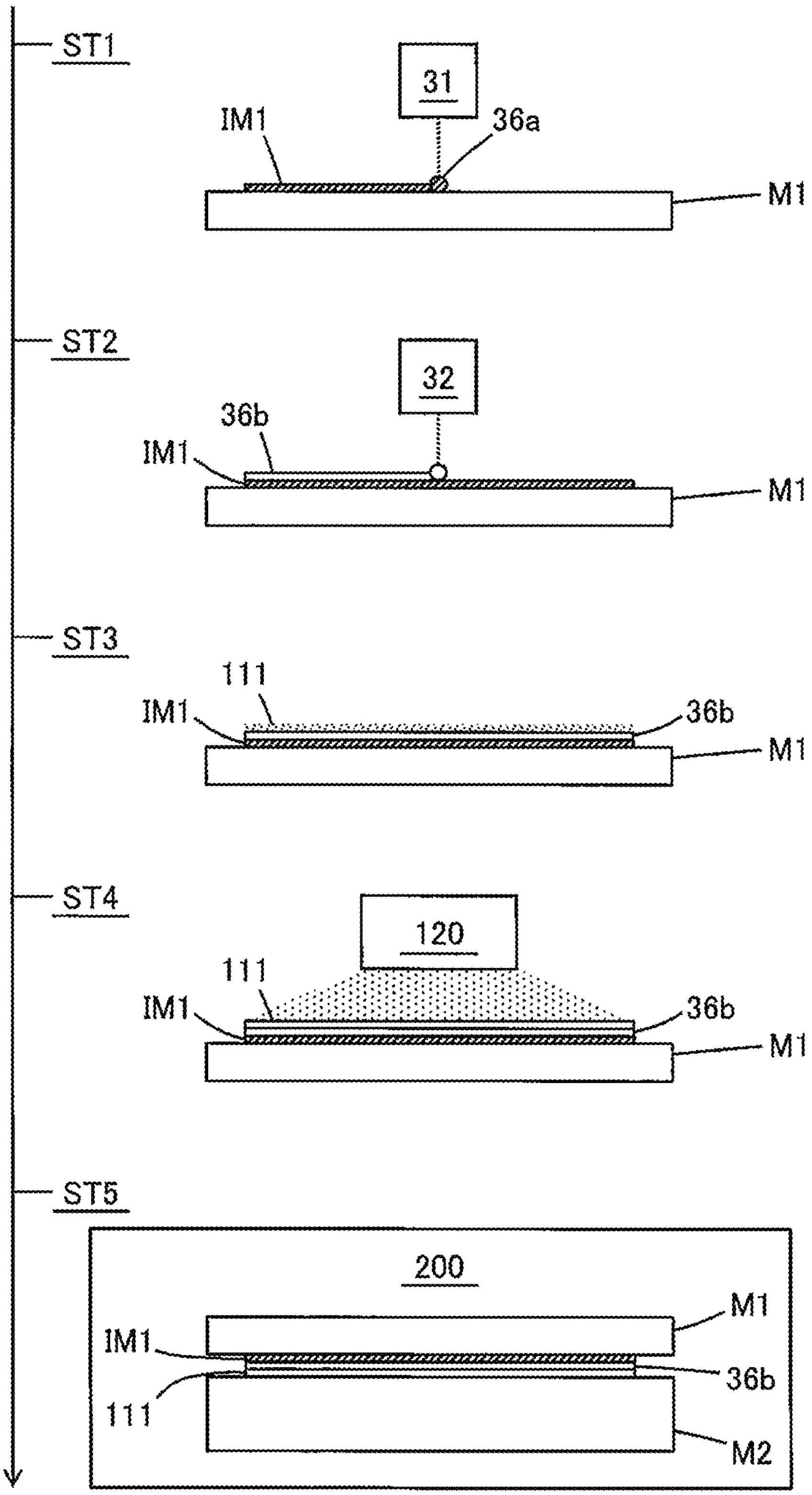
FIG. 5 is a diagram schematically showing an example of a printing method for a transfer target medium.

As shown in FIGS. 1, 5, and so on, a printing method according to one aspect is a printing method that performs printing on a transfer medium M1 in order to perform an adhesive application step ST3 for applying adhesive 111 on undercoat ink 36*b* that was overlaid on an image IM1 that was formed on the transfer medium M1, and a transfer step ST5 for transferring the image IM1 to a transfer target medium M2 by attaching the adhesive 111 to the transfer target medium M2. The present printing method includes the following steps.

(a1) An image forming step ST1 for forming the image IM1 on the transfer medium M1 by ejecting colored ink 36*a* from a first inkjet head (for example, a colored ink head 31).

(a2) An undercoat forming step ST2 for ejecting the undercoat ink 36*b* from a second inkjet head (32) to overlay the undercoat ink 36*b* on the image IM1 by moving a second inkjet head (for example, an undercoat ink head 32) relative to the transfer medium M1 in the first direction D1.

Figure 2:
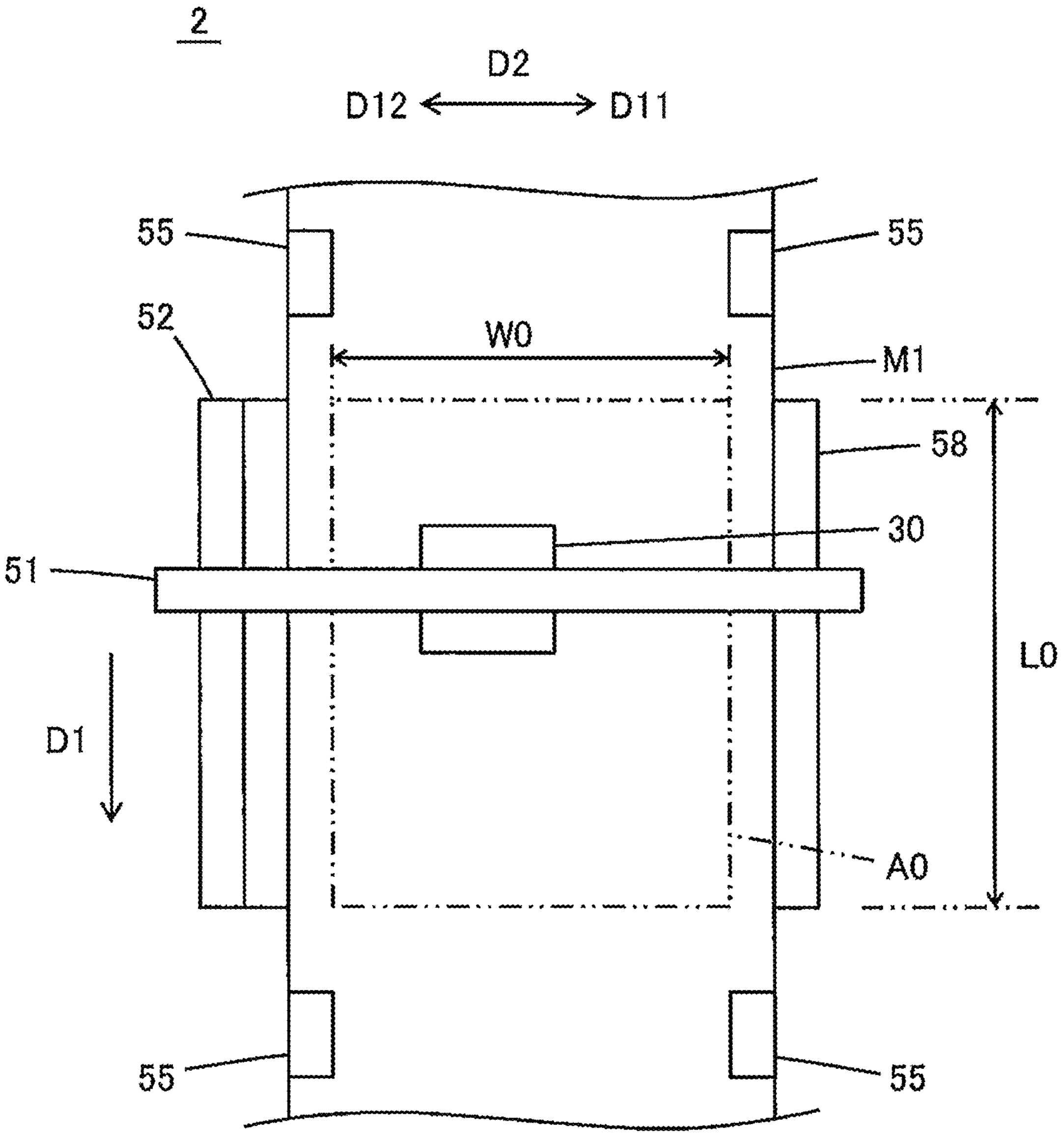
FIG. 2 is a plan view schematically showing an example of a configuration of a printer.
Figure 6:
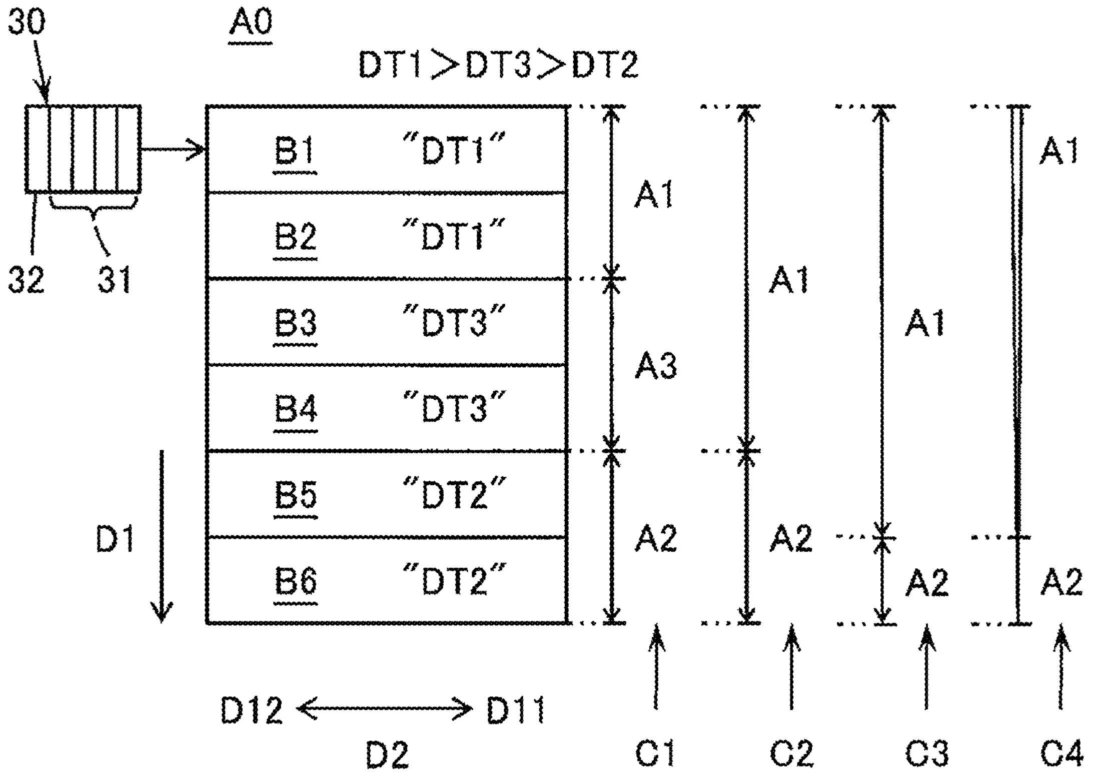
FIG. 6 is a diagram schematically showing an example of how a process unit region is divided into regions.

Here, as shown in FIGS. 2, 6, and so on, a region in which the adhesive 111 is applied to the transfer medium M1 at the same timing in the adhesive application step ST3 is defined as a process unit region A0. The process unit region A0 includes a first region A1 and a second region A2 in which the undercoat ink 36*b* is overlaid on the image IM1 after the first region A1. In the present printing method, in the undercoat forming step ST2, an ejection amount of the undercoat ink 36*b* per unit area for the second region A2 is less than an ejection amount of the undercoat ink 36*b* per unit area for the first region A1.

In the above process unit region A0, the undercoat ink ejection amount for the second region A2 where the undercoat ink 36*b* is overlaid on the image IM1 after the first region A1 is less than that for the first region A1. Therefore, flow of the undercoat ink 36*b* due to tilting of the transfer medium M1 in the adhesive application step ST3 is suppressed. By suppressing flow of the undercoat ink 36*b*, bleeding of the transfer image (the image IM1 to be transferred) due to the undercoat ink 36*b* dripping downward or the like is suppressed. Therefore, the above aspect can provide a printing method that is capable of suppressing bleeding of the transfer image.

Various examples of the above aspect are conceivable. Moving the second inkjet head (32) in the first direction D1 relative to the transfer medium M1 includes moving the second inkjet head (32) in the first direction D1 without moving the transfer medium M1, moving the transfer medium M1 in a direction opposite to the first direction D1 without moving the second inkjet head (32), and moving both the transfer medium M1 and the second inkjet head (32) in the first direction D1. The second inkjet head (32) may also move relative to the transfer medium M1 in a second direction D2 that intersects the first direction D1. The first inkjet head (31) may move relative to the transfer medium M1 together with the second inkjet head (32), or it may move relative to the transfer medium M1 independently of the second inkjet head (32).

The process unit region A0 includes the following regions.

Figure 8:
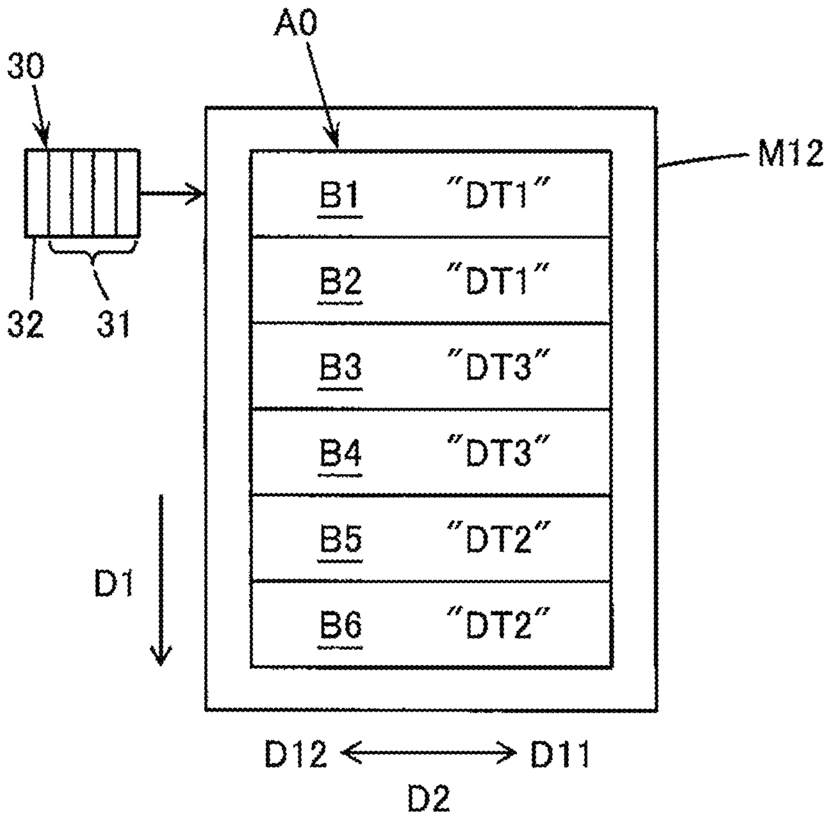
FIG. 8 is a diagram schematically showing an example of the process unit region in a cut sheet paper.

(region b1) In a case where the transfer medium is a cut sheet paper, a region corresponding to one single cut sheet paper (for example, see FIG. 8).

Figure 7:
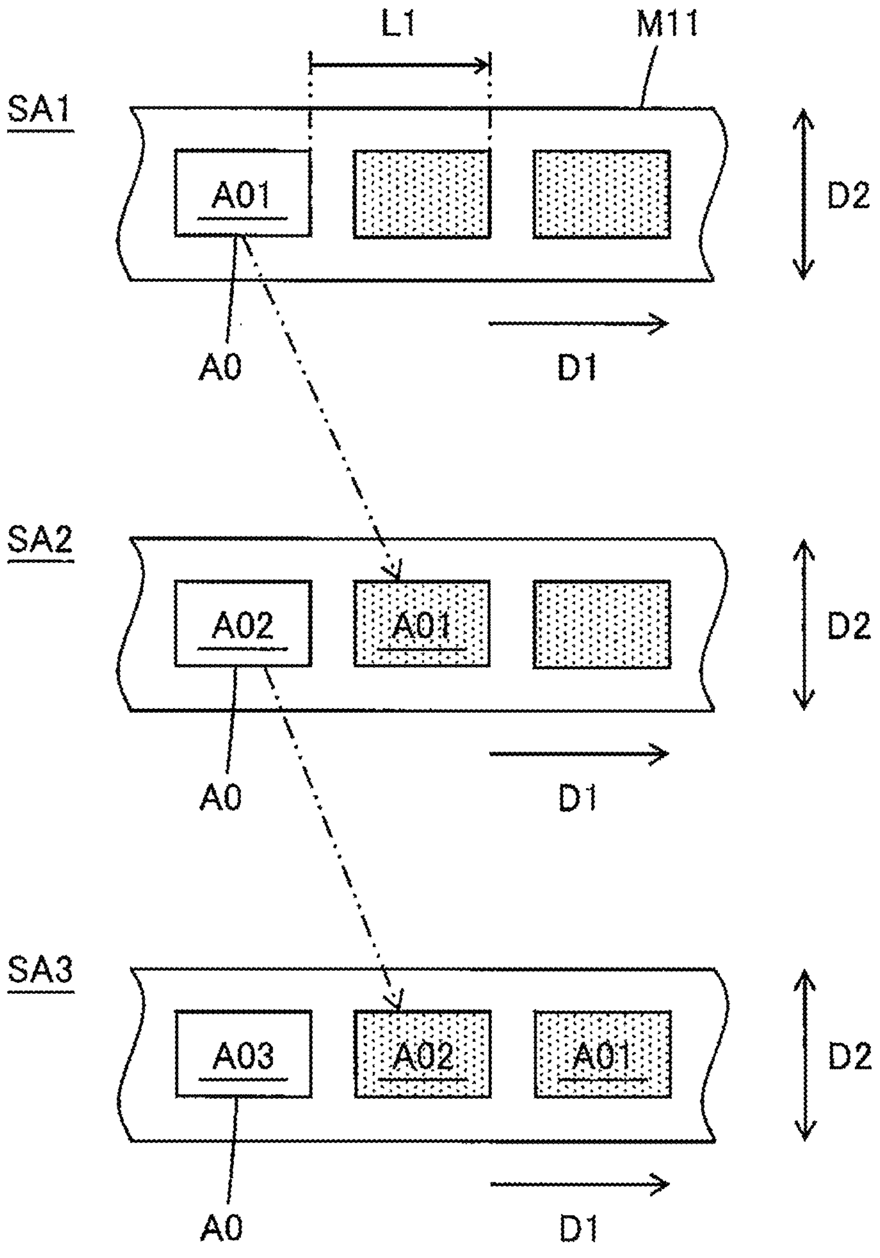
FIG. 7 is a diagram schematically showing an example of an intermittent transport in a lateral type printing.

(region b2) In a case where the transfer medium, which is continuous paper on which lateral type printing is performed, is transported intermittently, a region corresponding to a single transport amount (for example, see FIG. 7).

Figure 9:
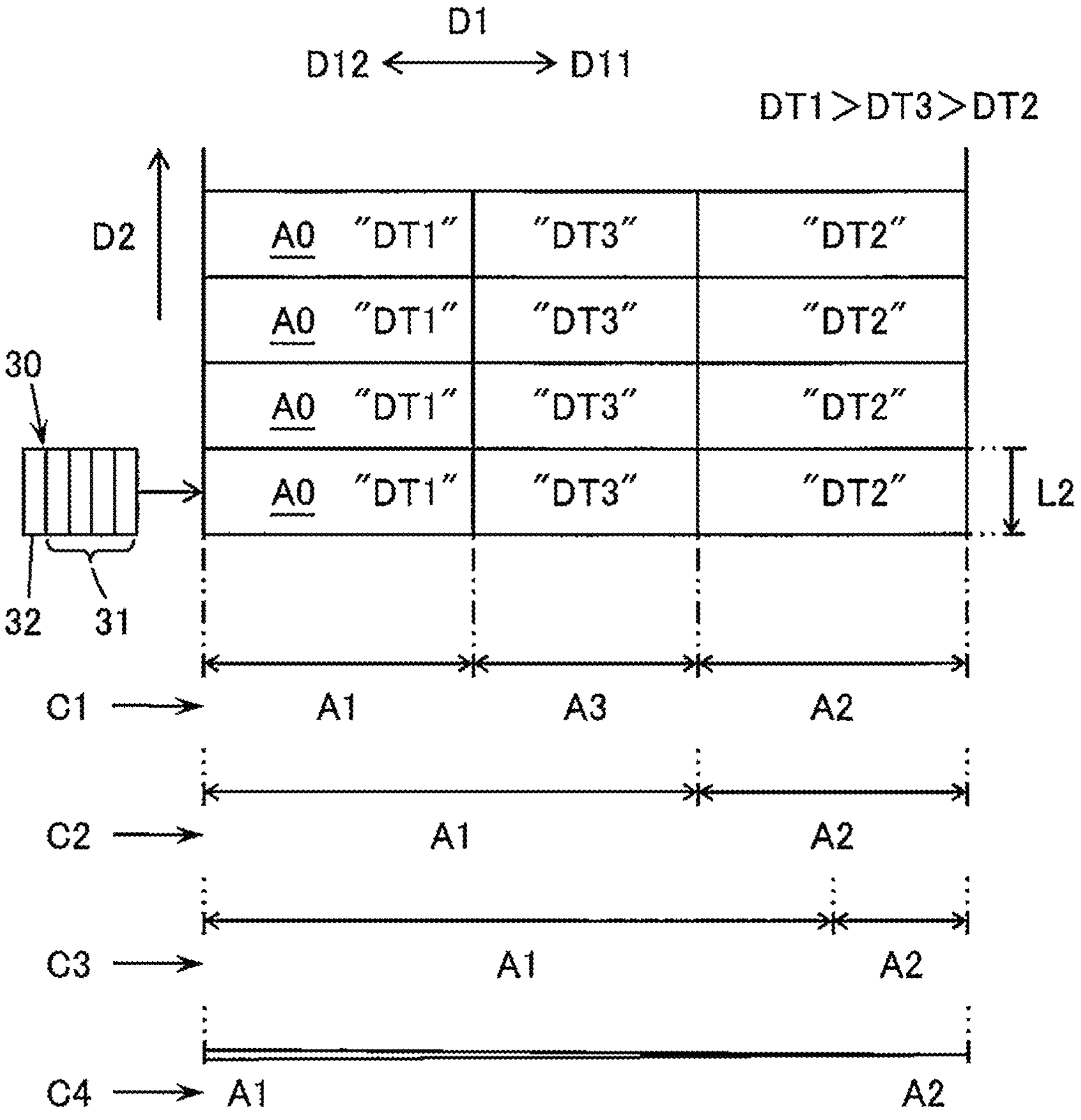
FIG. 9 is a diagram schematically showing an example of how the process unit region is divided into regions that corresponds to a transport amount of a single sub-scanning.

(region b3) In the case where sub-scanning is performed on the transfer medium on which serial type printing is being performed, a region corresponding to the transport amount for one sub-scanning (for example, see FIG. 9).

Figure 10:
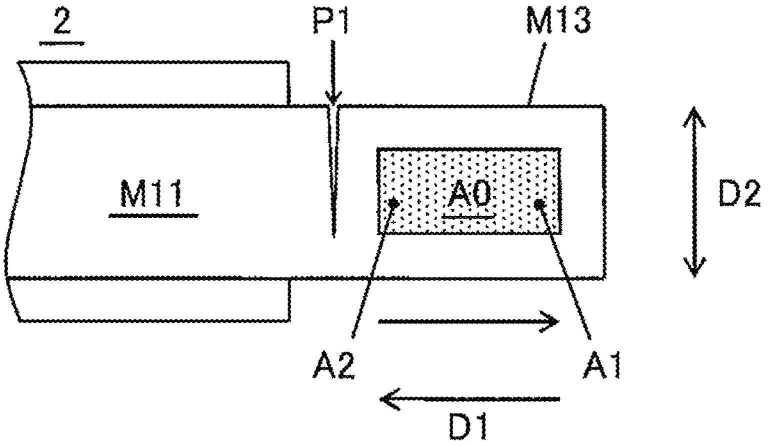
FIG. 10 is a diagram schematically showing an example of the process unit region when continuous paper is cut.

(region b4) In a case where the transfer medium on which line type printing was performed is cut, a region corresponding to one cut transfer medium (for example, see FIG. 10).

Note that the printing on the cut sheet paper may be performed by any one of lateral type printing, serial type printing, and line type printing. Lateral type printing is a printing method in which an inkjet head ejects ink while moving the inkjet head in a main scanning direction and a sub-scanning direction that intersects the main scanning direction for the process unit region of the transfer medium. Lateral type printing for continuous paper is a printing method in which an inkjet head ejects ink while moving the inkjet head, with respect to the above region b2 of the transfer medium that is stopped, in the transport direction and a direction that intersects the transport direction, and in which the continuous paper is intermittently transported in the transport direction in units corresponding to the above region b2. Serial type printing is a printing method in which an inkjet head ejects ink while moving the inkjet head reciprocally in a main scanning direction, and a sub-scanning is performed between main scannings. Line type method is a printing method in which an inkjet head, which has a length equal to or longer than a width of the continuous paper, ejects ink to the continuous paper being transported.

The material of the cut sheet paper and the continuous paper is not strictly limited to paper, and may be resin, metal, or the like.

In the undercoat forming step ST2, the second inkjet head (32) that is moving relatively in the first direction D1 may eject undercoat ink 36*b* or the second inkjet head (32) that is moving relatively in the second direction D2 without changing the relative position in the first direction D1 may eject the undercoat ink 36*b*. The process unit region A0 may include a third region A3 in which the undercoat ink 36*b* is overlaid on the image IM1 after the first region A1 and before the second region A2. In this case, in the undercoat forming step ST2, the ejection amount of the undercoat ink 36*b* per unit area for the third region A3 may be greater than the ejection amount of the undercoat ink 36*b* per unit area for the second region A2 and may be less than the ejection amount of the undercoat ink 36*b* per unit area for the first region A1. In this application, "first", "second", and so on are terms for identifying components included in a plurality of components having a similar point, and do not mean an order. Of course, the above additional remark also applies to the following aspects.

Aspect 2

As shown in FIG. 6 and so on, the first region A1 may include a portion where the undercoat ink 36*b* is first overlaid on the image IM1 in the process unit region A0. The second region A2 may include a portion where the undercoat ink 36*b* is lastly overlaid on the image IM1 in the process unit region A0. In the process unit region A0, the undercoat ink ejection amount for a portion where the undercoat ink 36*b* is applied lastly to the image IM1 is less than the undercoat ink ejection amount for a portion where the undercoat ink 36*b* is applied first to the image IM1. Therefore, flow of the undercoat ink 36*b* is further suppressed due to the tilting of the transfer medium M1 in the adhesive application step ST3. Therefore, in the above aspect, bleeding of the transfer image can be further suppressed.

Aspect 3

Figure 13:
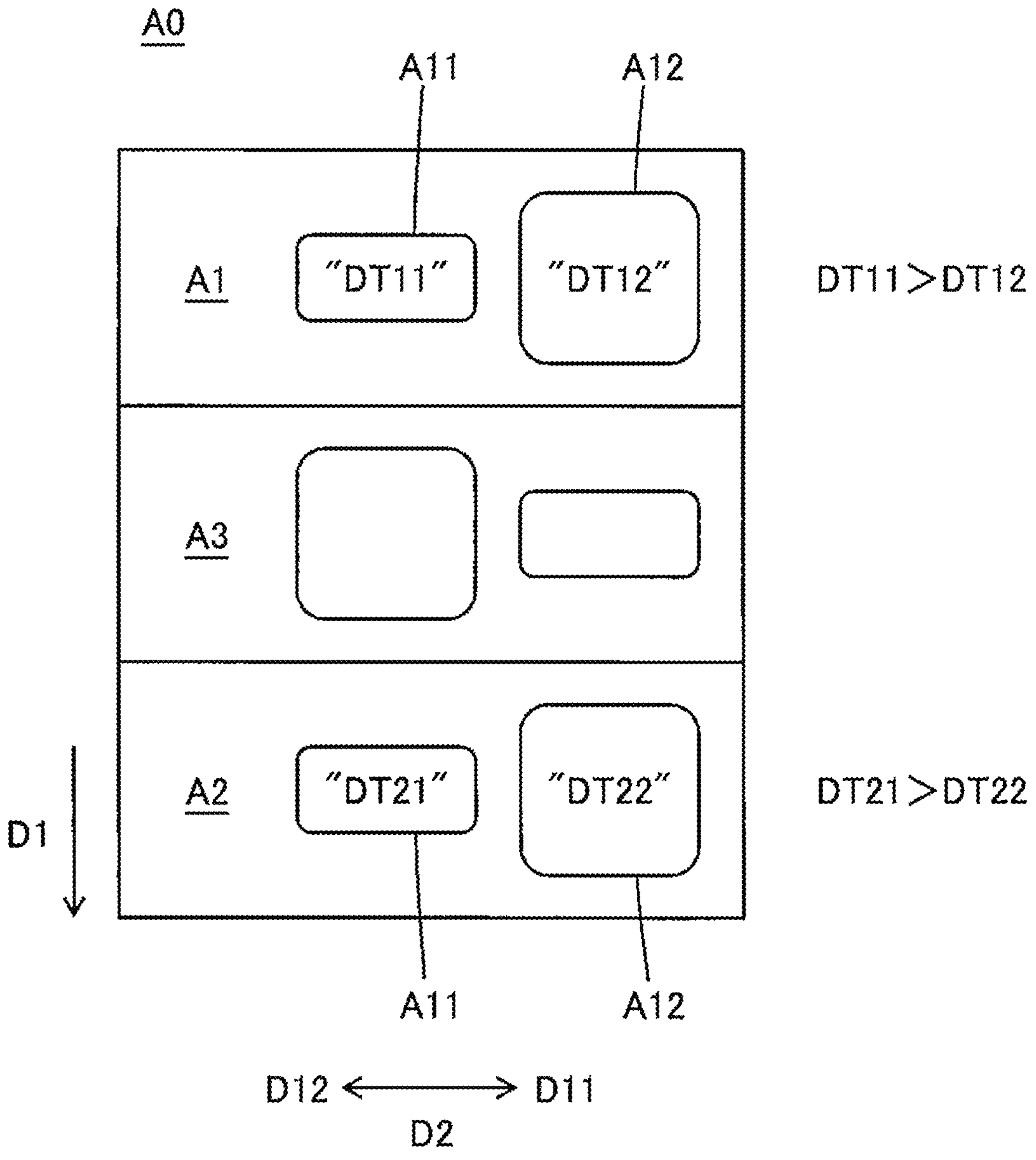
FIG. 13 is a diagram schematically showing an example of changing an undercoat ink ejection amount according to the size of a continuous region of the image in the same region.

As shown in FIG. 13, at least one region of the first region A1 and the second region A2 may include, as the image IM1 within the regions, a first continuous region A11 that is connected to one image, and a second continuous region A12 that is connected to one image and is separated from the first continuous region A11. Here, it is assumed that the second continuous region A12 is larger in area than the first continuous region A11. In the present printing method, in the undercoat forming step ST2, the ejection amount of the undercoat ink 36*b* per unit area with respect to the second continuous region A12 may be less than the ejection amount of the undercoat ink 36*b* per unit area with respect to the first continuous region A11. As the continuous region becomes larger, flow of the undercoat ink 36*b* caused by tilting of the transfer medium M1 in the adhesive application step ST3 is more likely to occur. The undercoat ink ejection amount for the second continuous region A12, which has a large area in the first region A1 or the second region A2, is small. Therefore, flow of the undercoat ink 36*b* is further suppressed due to tilting of the transfer medium M1 in the adhesive application step ST3. Therefore, in the above aspect, bleeding of the transfer image can be further suppressed.

Aspect 4

As shown in FIG. 6 and so on, in the undercoat forming step ST2, the present printing method may perform a main scanning in which the second inkjet head (32) ejects the undercoat ink 36*b* while moving the second inkjet head (32) relative to the transfer medium M1 along a second direction D2 that intersects the first direction D1, and then may change a position in the first direction D1 where the undercoat ink 36*b* is overlaid on the image IM1 while moving the second inkjet head (32) relative to the transfer medium M1 in the first direction D1 during a sub-scanning between main scannings. The second region A2 may be a region in which the undercoat ink 36*b* is overlaid on the image IM1 in the main scanning that is subsequent to the main scanning in which the undercoat ink 36*b* is overlaid on the image IM1 in the first region A1. In printing in which a main scanning and a sub-scanning are performed as in lateral type printing or serial type printing, a difference in time of deposit when the undercoat ink 36*b* is deposited will be greater in a sub-scanning direction than in a main scanning direction. Therefore, it is desirable to change the ejection amount of the undercoat ink 36*b* in the sub-scanning direction rather than to change that in the main scanning direction. Therefore, the above aspect, in the case of printing that involves a main scanning and a sub-scanning, can be suitably suppressed blurring of the transfer image.

Here, the printing according to the aspect 4 may be performed by one pass or may be performed by multiple passes (two or more passes). The number of passes means the number of times of main scannings that accompanies ejecting of the undercoat ink for the same portion. The above additional remark also applies to the following aspects.

Aspect 5

As shown in FIG. 9, in the undercoat forming step ST2, the present printing method may perform main scanning that ejects the undercoat ink 36*b* while moving the second inkjet head (32) in the first direction D1 relative to the transfer medium M1. The second region A2 may be a region where the undercoat ink 36*b* is overlaid on the image IM1 after the first region A1 in the main scanning in which the undercoat ink 36*b* is overlaid on the image IM1 in the first region A1. There is a difference in the time of deposit when the undercoat ink 36*b* is deposited even in one main scanning, and the longer the distance of the main scanning is, the larger the difference in the time of deposit of the undercoat ink 36*b* will be. The ejection amount of the undercoat ink that is overlaid on the second region A2 where the undercoat ink 36*b* is overlaid on the image IM1 after the first region A1, is less than the ejection amount of the undercoat ink that is overlaid on the first region A1 during a single main scanning, so flow of the undercoat ink 36*b* caused by tilting the transfer medium M1 in the adhesive application step ST3 is suppressed. Therefore, the above aspect can be suitably suppressed blurring of the transfer image caused by a difference in the time of deposit of the undercoat ink during the main scanning. Of course, it is also possible to perform the following. As in aspect 4, set the first region A1 and second region A2 by considering the sub-scanning direction to be the first direction D1, and change the ejection amount of the undercoat ink 36*b*, and then, as in aspect 5, set the first region A1 and second region A2 by considering the main scanning direction to be the first direction D1, and change the ejection amount of the undercoat ink 36*b*.

Aspect 6

Figure 11:
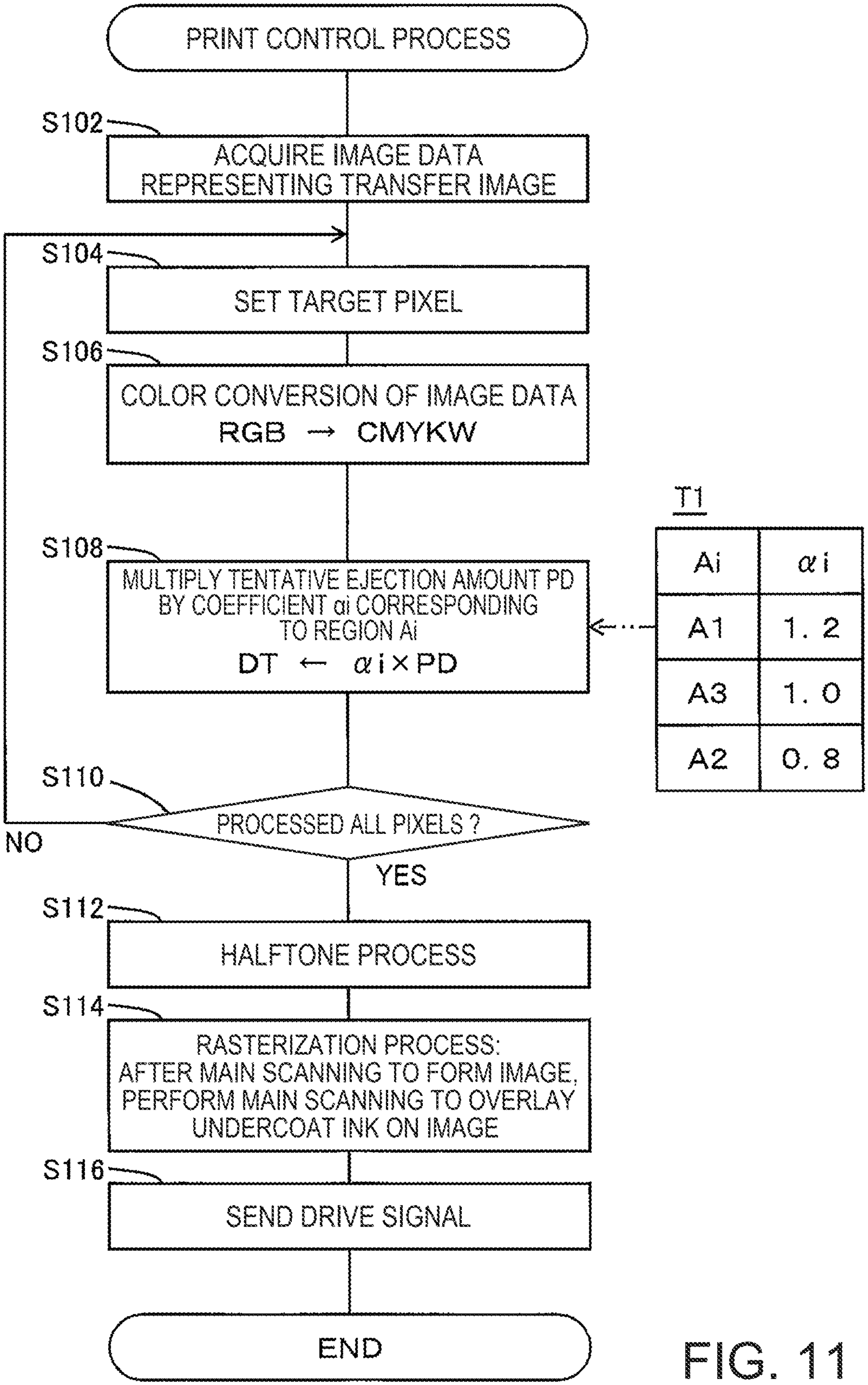
FIG. 11 is a flowchart schematically showing an example of a print control process.

As shown in FIG. 11, in the undercoat forming step ST2, the present printing method may determine a tentative ejection amount PD of the undercoat ink 36*b* for the process unit region A0 regardless of a position in the first direction D1, and may determine the ejection amount DT of the undercoat ink 36*b* for the first region A1 and the second region A2 by multiplying the tentative ejection amount PD by a coefficient αi corresponding to the position in the first direction D1. Note that the ejection amount DT of the undercoat ink 36*b* is also referred to as the undercoat ink ejection amount DT. In this case, the undercoat ink ejection amount DT can be easily changed between the first region A1 and the second region A2. By accepting the user's input of the coefficient αi, the undercoat ink ejection amount DT can be adjusted according to the user's needs.

Note that whether the image transferred to the transfer target medium will be of the intended image quality will also be affected by the amount and composition of the colored ink for the image, the amount and composition of the adhesive that is applied on the undercoat ink, and other factors, in addition to the amount and composition of the undercoat ink. Therefore, strictly speaking, the coefficient must be determined in consideration of an enormous number of possible combinations such as the amount and composition of the ink, the type of the transfer medium, the amount and type of the adhesive, and the type of the transfer target medium. By accepting the user's input of the coefficient, there is no need to prepare coefficients for all of the enormous number of possible combinations, which helps to reduce memory requirements.

Aspect 7

The undercoat ink 36*b* may be an ink containing a component that blocks transmission of light. In this case, the color of the transfer target medium M2 is not seen through the image portion, so that the image quality of the transfer image can be improved. Here, the ink containing a component that blocks light transmission includes an ink that contains a component that diffusely reflects light, such as white ink, an ink that contains a component that absorbs light, such as black ink, and an ink that contains a component that diffusely reflections and absorbs light, such as gray ink. This additional remark also applies to the following aspects.

Aspect 8

Figure 15:
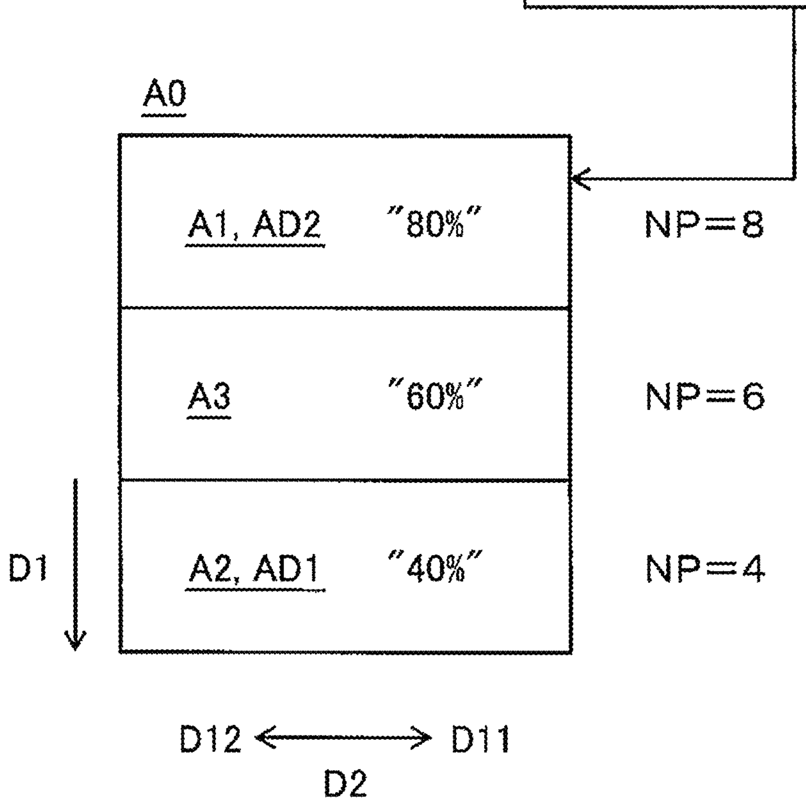
FIG. 15 is a diagram schematically showing an example of changing number of passes according to the undercoat ink ejection amount per unit area.

As shown in FIG. 6, it is assumed that printing is performed by performing the main scanning and sub-scanning. As shown in FIG. 15, the process unit region A0 may include a first ejection amount region AD1 in which the ejection amount per unit area of the undercoat ink 36*b* that is overlaid on the image IM1 is a first ejection amount (for example, 40% in FIG. 15), and may include a second ejection amount region AD2 in which the ejection amount per unit area of the undercoat ink 36*b* that is overlaid on the image IM1 is a second ejection amount (for example, 80% in FIG. 15) that is larger than the first ejection amount. The second ejection amount region AD2 is located at a position different from the first ejection amount region AD1 in the first direction D1, and it is assumed that the number of times of the main scanning that accompanies the ejection of the undercoat ink and that is performed at the same location on the transfer medium M1 is the number of passes NP. In the present printing method, in the undercoat forming step ST2, the number of passes NP in the second ejection amount region AD2 may be greater than the number of passes NP in the first ejection amount region AD1. In the region where the undercoat ink ejection amount is large, drying of the undercoat ink 36*b* progresses due to the increase in the number of passes NP, so the flow of the undercoat ink 36*b* due to tilting of the transfer medium M1 in the adhesive application step ST3 is further suppressed. Therefore, in the above aspect, bleeding of the transfer image can be further suppressed.

Aspect 9

Figure 3:
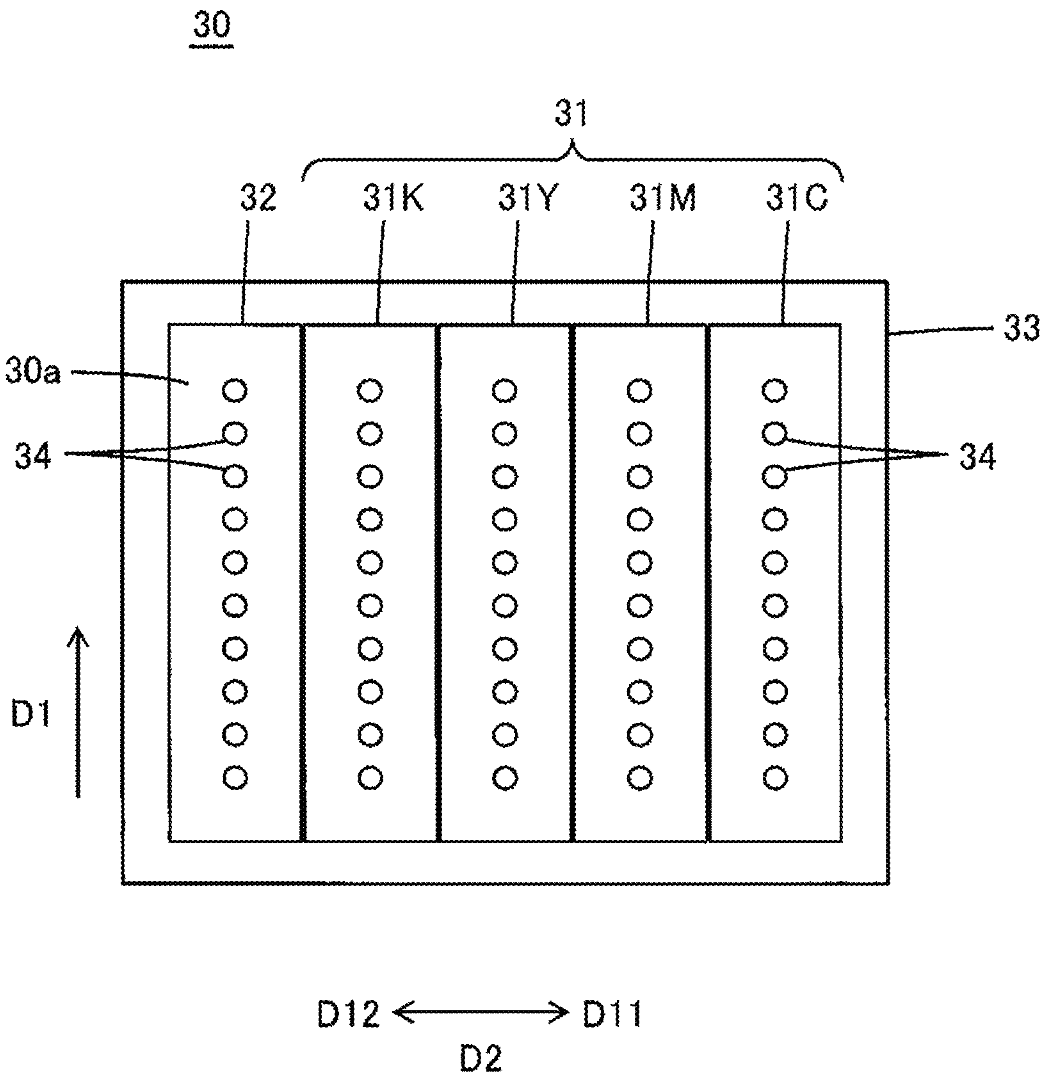
FIG. 3 is a bottom view schematically showing an example of a nozzle surface of an inkjet head.
Figure 4:
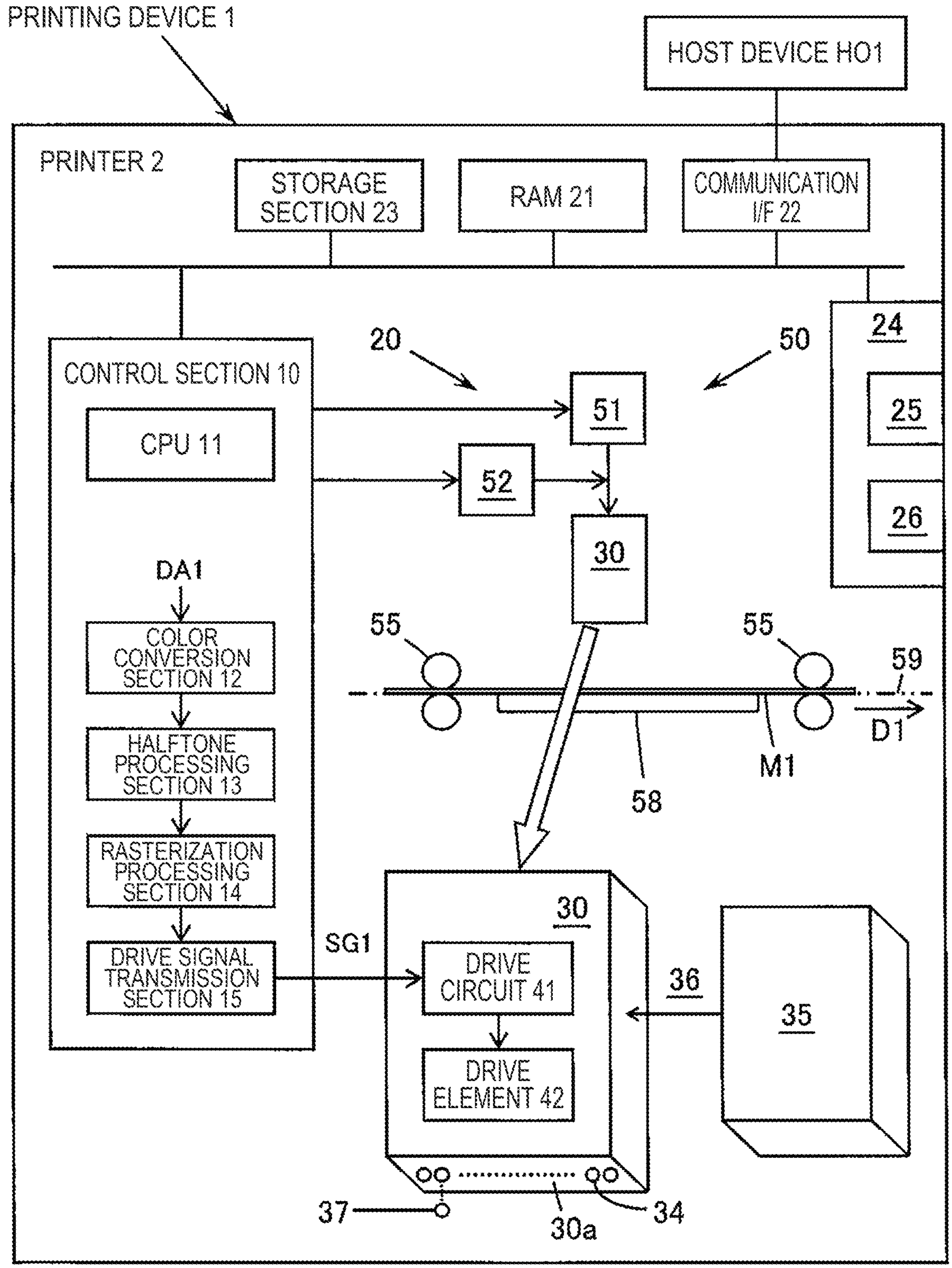
FIG. 4 is a block diagram schematically showing an example of a configuration of a printing device.

As shown in FIGS. 1 and 5, the printing device 1 according to one aspect is a printing device 1 that performs printing on the transfer medium M1 in order to perform an adhesive application step ST3 that applies the adhesive 111 on the undercoat ink 36*b* that was overlaid on the image IM1 that was formed on the transfer medium M1, and to perform a transfer step ST5 that transfers the image IM1 to the transfer target medium M2 by attaching the adhesive 111 to the transfer target medium M2. As shown in FIGS. 2 to 4, the printing device 1 is equipped with a first inkjet head (31) that ejects colored ink 36*a*, a second inkjet head (32) that ejects undercoat ink 36*b*, a drive section 50, and a control section 10. The drive section 50 moves the second inkjet head (32) in the first direction D1 relative to the transfer medium M1. The control section 10 controls ejection of the colored ink 36*a* from the first inkjet head (31), ejection of the undercoat ink 36*b* from the second inkjet head (32), and the drive section 50. As shown in FIG. 5, the control section 10 performs control to form the image IM1 on the transfer medium M1 with the colored ink 36*a*, which is ejected from the first inkjet head (31), and to overlay the undercoat ink 36*b*, which is ejected from the second inkjet head (32), on the image IM1. Here, it is assumed that a region where the adhesive 111 is applied to the transfer medium M1 at the same timing in the adhesive application step ST3 is the process unit region A0. The process unit region A0 includes a first region A1 and a second region A2 in which the undercoat ink 36*b* is overlaid on the image IM1 after the first region A1. The control section 10 causes the ejection amount of the undercoat ink 36*b* per unit area for the second region A2 to be less than the ejection amount of the undercoat ink 36*b* per unit area for the first region A1.

According to the above aspect, it is possible to provide a printing device that can suppress bleeding of a transfer image.

Furthermore, the above aspects can be applied to a printing system including the above printing device, a method for controlling the above printing device, a method for controlling the above printing system, a control program for the above printing device, a control program for the above printing system, a computer-readable recording medium on which any of the above programs is recorded, and the like. The above printing device may also be configured with multiple distributed components.

2. SPECIFIC EXAMPLE OF PRINTING DEVICE

FIG. 1 schematically shows a configuration of a printing system that forms an image IM1 on a transfer medium M1 and transfers the image IM1 to a transfer target medium M2. The printing system shown in FIG. 1 includes a printing device 1, an adhesive application device 100, and a thermal transfer device 200. The printing device 1 may be configured with a single printer 2, but as shown in FIG. 1, it may also be configured with a printer 2 and a host device HO1. The host device HO1 shown in FIG. 1 can generate image data DA1 corresponding to an image IM1 to be transferred, and can transmit the image data DA1 to the printer 2. Hereinafter, the image IM1 to be transferred is also referred to as a transfer image IM1. The printer 2 is equipped with a printing section 20 that ejects ink onto the transfer medium M1, and forms an image IM1 corresponding to the image data DA1 on the transfer medium M1. The adhesive application device 100 is equipped with an adhesive tank 110 that applies adhesive 111 to the ink on the transfer medium M1, and a heating section 120 that heats the transfer medium M1 after the adhesive has been applied. The thermal transfer device 200 transfers an image IM1 from the transfer medium M1 to the transfer target medium M2.

As the transfer medium M1, a transfer film or the like that can transfer an image using a direct to film (DTF) method can be used. As such a transfer film, a resin file such as a polyethylene terephthalate (PET) film or the like can be suitably used. Of course, the material of the transfer medium M1 may include paper, metal, or the like in addition to resin, and the transfer medium M1 may be a metal film or the like. As the adhesive 111, a powdered adhesive such as powdered hot melt adhesive can be used. Hot melt adhesive is a thermoplastic resin powder that melts when heated above its melting point and that solidifies when cooled. As the hot melt adhesive, an adhesive containing one or more thermoplastic resins selected from polyurethane resin, polyolefin resin, polyamide resin, polyester resin, and the like can be used. As the transfer target medium M2, fabrics such as knitted or woven cloth and non-woven cloth can be used, and processed fabrics such as a T-shirt can also be used.

As will be described in detail later, the image forming step ST1 and the undercoat forming step ST2 are performed in the printing device 1. The adhesive application step ST3 and the heating step ST4 are performed in the adhesive application device 100. The transfer step ST5 is performed in the thermal transfer device 200.

FIG. 2 is a plan view schematically showing a configuration of the printer 2 having an inkjet head 30. Note that the process unit region A0 shown in FIG. 2 is a rectangular region with a length L0 and a width W0. FIG. 3 is a bottom view schematically showing a nozzle surface 30*a* of the inkjet head 30. FIG. 4 is a block diagram schematically showing the configuration of the printing device 1. FIG. 5 schematically shows the printing method on the transfer target medium M2. FIG. 6 schematically shows an example of how the process unit region A0 is divided into regions. The printer 2 is an inkjet printer that ejects ink droplet 37 in liquid form. The printer 2 is equipped with a control section 10, a printing section 20, a random access memory (RAM) 21, which is a semiconductor memory, a communication interface (I/F) 22, a storage section 23, an operation panel 24, and the like. The control section 10, the RAM 21, the communication I/F 22, the storage section 23, and the operation panel 24 are connected to a bus so as to be able to input and output information to and from each other. The printing section 20 has an inkjet head 30 and a drive section 50.

The control section 10 has a central processing unit (CPU) 11, which is a processor, a color conversion section 12, a halftone processing section 13, a rasterization processing section 14, a drive signal transmission section 15, and the like. The control section 10 can be configured by a system on a chip (SoC) or the like. Based on the image data DA1 acquired from any one of the host device HO1, an external memory (not shown), and the like, the control section 10 controls the inkjet head 30 and the drive section 50 so that the image IM1 with the colored ink 36*a* and a layer with the undercoat ink 36*b* are formed on the transfer medium M1. As the image data DA1, for example, RGB data that has integer values representing 28 levels of grayscale for R (red), G (green), and B (blue) can be applied to each pixel.

The CPU 11 is a device that mainly performs information processing and control in the printer 2. The color conversion section 12 has, for example, a color conversion LUT (look-up table) in which a correspondence relationship between the grayscale values of R, G, and B and the grayscale values of C (cyan), M (magenta), Y (yellow), K (black), and W (white) is defined. The grayscale value of W in the color conversion LUT is, for example, a value that is used for the undercoat ink 36*b* when at least one colored ink 36*a* of C, M, Y, and K is used. As an example, in a case where the grayscale values of C, M, Y, and K are 0, which indicates that colored ink is not used, the grayscale value of W may be 0, which indicates that the undercoat ink is not used, and in the remaining cases, the grayscale value of W may be 128, which indicates that 50% of the undercoat ink is used. By this, the undercoat ink 36*b* is overlaid at a location of the image IM1. Of course, the ejection amount of the undercoat ink 36*b* that is overlaid on the image IM1 may be less than 50% or may be more than 50% to the extent that the transfer image IM1 with a desirable image quality can be obtained. The color conversion section 12 refers to the color conversion LUT and converts the RGB data into ink amount data that has integer values of, for example, 28 grayscales of C, M, Y, and K for each pixel. The ink amount data represents an amount of ink 36 used for C, M, Y, K, and W in each pixel. Note that the ink 36 shown in FIG. 4 includes the colored inks 36*a* of C, M, Y, and K, and the undercoat ink 36*b*. If resolution of the RGB data is different from printing resolution, the color conversion section 12 first converts the resolution of the RGB data to the printing resolution or converts resolution of the ink amount data to the printing resolution.

By performing halftone processing on the ink amount data using any of a dither method, an error diffusion method, and the like, the halftone processing section 13 generates dot data whose number of grayscale levels is reduced, for example 2 or 4. The dot data is generated for each of C, M, Y, K, and W. The dot data represents the formation state of dots of ink 36 in units of pixels. The rasterization processing section 14 generates raster data by performing a rasterization process that rearranges the dot data in the order in which dots are formed by the drive section 50.

The drive signal transmission section 15 generates, from the raster data, a drive signal SG1 corresponding to a voltage signal to be applied to a drive element 42 of the inkjet head 30 and outputs the drive signal SG1 to a drive circuit 41 of the inkjet head 30. The RAM21 stores the image data DA1 and the like received from the host device HO1 and the like. The communication I/F 22 inputs and outputs information to and from the host device HO1 or the like. Examples of the host device HO1 include computers such as personal computers or tablet terminals, mobile phones such as smartphones, and the like. The storage section 23 may be a nonvolatile semiconductor memory such as a flash memory, or a magnetic storage device such as a hard disk. The operation panel 24 is equipped with an output section 25 such as a liquid crystal panel that displays information, an input section 26 such as a touch panel that receives operations on a display screen, and the like.

The drive circuit 41 applies a voltage signal to the drive element 42 in accordance with the drive signal SG1 input from the drive signal transmission section 15. The drive element 42 may be a piezoelectric element that applies pressure to the ink 36 in a pressure chamber communicating with the nozzles 34, or it may be a drive element that generates bubbles in the pressure chamber by heat and ejects the ink droplet 37 from the nozzles 34. The ink 36 is supplied from an ink cartridge 35 to the pressure chamber of the inkjet head 30. The ink 36 in the pressure chamber is ejected as the ink droplet 37 from the nozzles 34 toward the transfer medium M1 by the drive element 42. When the ink droplet 37 lands on the transfer medium M1, a dot is formed on the transfer medium M1. When dots of the colored ink 36*a* are formed on the transfer medium M1, an image IM1 represented by a pattern of the dots is formed on the transfer medium M1.

The inkjet head 30 shown in FIG. 3 includes a colored ink head 31 that ejects the colored ink 36*a* and an undercoat ink head 32 that ejects the undercoat ink 36*b*. The colored ink head 31 is an example of a first inkjet head, and the undercoat ink head 32 is an example of a second inkjet head. The colored ink 36*a* is an ink that contains colorants, which are called pigments, as a dispersed substance or a solute in a liquid (for example, water) as a dispersant or a solvent. The colored ink 36*a* includes, for example, chromatic inks of C, M, and Y, and an achromatic ink of K. The colored ink head 31 includes a C ink head 31C that ejects C ink, an M ink head 31M that ejects M ink, a Y ink head 31Y that ejects Y ink, and a K ink head 31K that ejects K ink. The undercoat ink 36*b* is an ink that contains a component that blocks transmission of light, for example, a W ink that contains a component that diffusely reflects light. The W ink is, for example, an ink that contains a white pigment such as titanium oxide or zinc oxide as dispersed substance in a liquid such as water as a dispersant. Since the undercoat ink 36*b* blocks the transmission of light, the color of the transfer target medium M2, which serves as the background of the image IM1, does not affect the color of the image IM1, and the transfer target medium M2 that has an image IM1 of good image quality is obtained. Each of the ink heads (31C, 31M, 31Y, 31K, 32) has a nozzle array in which a plurality of nozzles 34 are arranged in a nozzle arrangement direction that intersects the second direction D2 as a scanning direction, for example, in the first direction D1. The plurality of nozzles 34 of each ink head may be arranged in a staggered pattern in the nozzle arrangement direction, in other words, arranged in two rows in the nozzle arrangement direction. The nozzle alignment direction may be shifted from the first direction D1 within a range of less than 90 degrees. Each nozzle 34 of the colored ink head 31 ejects the colored ink 36*a* as an ink droplet 37, and each nozzle 34 of the undercoat ink head 32 ejects the undercoat ink 36*b* as an ink droplet 37. The inkjet head 30 shown in FIGS. 2 to 4 is mounted on a carriage 33. When the printer 2 performs lateral type printing, the carriage 33 is movable along the second direction D2 as a main scanning direction and the first direction D1 as a sub-scanning direction.

The drive section 50 in the lateral type printing is equipped with a main scanning drive section 51, a sub-scanning drive section 52, and a transport section 55. The main scanning drive section 51 shown in FIG. 2 performs main scanning that ejects ink 36 from the inkjet head 30 in at least one of scanning in a forward direction D11 and a return direction D12 while moving the inkjet head 30 along the second direction D2 as the main scanning direction. In terms of the undercoat ink head 32, it can be said that the main scanning drive section 51 performs main scanning that ejects the undercoat ink 36*b* while moving the undercoat ink head 32 relative to the transfer medium M1 along the second direction D2. The sub-scanning drive section 52 shown in FIG. 2 performs sub-scanning that moves, between main scannings, the inkjet head 30 along the first direction D1 as the sub-scanning direction. In other words, during sub-scanning, the inkjet head 30 intermittently moves along the first direction D1.

In terms of the undercoat ink head 32, the sub-scanning drive section 52 moves the undercoat ink head 32 relative to the transfer medium M1 in the first direction D1 in the sub-scanning between main scannings. The transport section 55 shown in FIG. 2 transports the transfer medium M1, which is continuous paper, along the first direction D1 as the transport direction between printing of the process unit region A0. In other words, during non-printing, the transfer medium M1 intermittently moves along the first direction D1. The transport section 55 shown in FIGS. 2 and 4 transports the transfer medium M1 in the first direction D1 along a transport path 59. A platen 58 is located below the transport path 59 and supports the transfer medium M1 by contacting the transfer medium M1 in the transport path 59. The inkjet head 30, which is controlled by the control section 10, ejects the ink droplet 37 toward the transfer medium M1 that is supported by the platen 58 to deposit the ink 36 on the transfer medium M1. The control section 10 controls the ejection of the colored ink 36*a* from the colored ink head 31, the ejection of the undercoat ink 36*b* from the undercoat ink head 32, and the drive section 50.

Note that various arrangements of the undercoat ink head 32 are conceivable as long as the undercoat ink 36*b* can be overlaid on the image IM1 formed by the colored ink 36*a*. For example, the undercoat ink head 32 may be located in the forward direction D11 side from the C ink head 31C shown in FIG. 3, or it may be located in an opposite direction side to the sub-scanning direction from the colored ink head 31.

Next, referring to FIGS. 5, 6, and so on, a printing method for the transfer target medium M2 will be described. The printing method shown in FIG. 5 includes the following steps.

(c1) An image forming step ST1 for forming the image IM1 on the transfer medium M1 by ejecting the colored ink 36*a* from the colored ink head 31.

(c2) An undercoat forming step ST2 for overlaying the undercoat ink 36*b* on the image IM1 by ejecting the undercoat ink 36*b* from the undercoat ink head 32 while moving the undercoat ink head 32 relative to the transfer medium M1 in the first direction D1.

(c3) An adhesive application step ST3 for applying the adhesive 111 on the undercoat ink 36*b* that was overlaid on the image IM1 that was formed on the transfer medium M1.

(c4) A heating step ST4 for heating the transfer medium M1 on which the adhesive 111 was applied.

(c5) A transfer step ST5 for transferring the image IM1 to the transfer target medium M2 by attaching the adhesive 111 to the transfer target medium M2.

For example, as shown in FIG. 6, it is assumed that ink 36 is ejected from the inkjet head 30 to the process unit region A0 in units of bands B1 to B6. For example, in a case where, for each band, a first main scanning in which the colored ink 36*a* is applied is performed and then a second main scanning in which the undercoat ink 36*b* is applied is performed, the image forming step ST1 is performed in the first main scanning, and the undercoat forming step ST2 is performed in the second main scanning. If the first main scanning is a main scanning in the forward direction D11, the second main scanning may be a main scanning in the return direction D12 as in bidirectional printing, or it may be a main scanning in the forward direction D11 as in unidirectional printing. As long as the undercoat ink 36*b* is overlaid on the image IM1 formed with the colored ink 36*a* without mixing, the image forming step ST1 and the undercoat forming step ST2 may be performed in a single main scanning in the forward direction D11 by the inkjet head 30 shown in FIG. 3. For each band, the image IM1 may be formed in one pass, the undercoat ink 36*b* may be overlaid on the image IM1 in one pass, the image IM1 may be formed in multiple passes, or the undercoat ink 36*b* may be overlaid on image IM1 in multiple passes.

In the example shown in FIG. 1, the transfer medium M1 on which the undercoat ink 36*b* was overlaid on the image IM1 is intermittently transported from the printer 2 to the adhesive application device 100, and is tilted and introduced into the adhesive tank 110. When the adhesive tank 110 contains adhesive 111 in powder form, the adhesive 111 adheres to the undercoat ink 36*b* that has not dried yet. FIG. 5 shows, in the adhesive application step ST3, a state of the transfer medium M1 on which image IM1, undercoat ink 36*b*, and powdered adhesive 111 are layered in order on the transfer medium M1. In this way, the adhesive application step ST3 is performed. In the example shown in FIG. 1, the transfer medium M1 on which the thermoplastic adhesive 111 is applied is intermittently transported from the adhesive tank 110 to the heating section 120. During this time, the excess adhesive 111 is shaken off as the transfer medium M1 is tilted again or the like. The heating section 120 heats the transfer medium M1 on which the adhesive 111 is applied. If the transfer medium M1 is heated to a temperature equal to or greater than the melting temperature of the adhesive 111, the adhesive 111 melts. FIG. 5 shows, in the heating step ST4, a state of the transfer medium M1 on which the image IM1, the dried undercoat ink 36*b*, and the melted adhesive 111 are layered in this order on the transfer medium M1. If the thermal transfer device 200 can heat the transfer medium M1, the heating section 120 may preheat the transfer medium M1 to a temperature lower than the melting temperature of the adhesive 111. In this way, the heating step ST4 is performed. In the example shown in FIG. 1, the heated transfer medium M1 is intermittently discharged from the heating section 120. The discharged transfer medium M1 is cut as necessary, the transfer medium M1 is placed on the transfer target medium M2 so that a surface on which the adhesive 111 was applied faces the transfer target medium M2, and the transfer target medium M2 is transported into the thermal transfer device 200.

The thermal transfer device 200 pressurizes the transfer medium M1 and the transfer target medium M2 in a state in which the adhesive 111 that was applied to the transfer medium M1 is in contact with the transfer target medium M2. If the thermal transfer device 200 is equipped with a heating mechanism, the thermal transfer device 200 heats the transfer medium M1 and the transfer target medium M2 to a temperature equal to or greater than the melting temperature of the adhesive 111. FIG. 5 shows a state where the melted adhesive 111, the dried undercoat ink 36*b*, the image IM1, and the transfer medium M1 are laminated in this order on the transfer target medium M2. By pressurizing the transfer medium M1 and the transfer target medium M2, the image IM1 is attached to the transfer target medium M2 via the undercoat ink 36*b* and the adhesive 111. In this way, the transfer step ST5 that transfers the image IM1 to the transfer target medium M2 is performed. When the transfer medium M1 is peeled off from the transfer target medium M2, the image IM1 remains on the transfer target medium M2 and, as shown in FIG. 1, the transfer target medium M2 to which the image IM1 has been transferred is obtained. Since there is an undercoat ink 36*b* layer between the transfer image IM1 and the transfer target medium M2, the color of the transfer target medium M2 is suppressed from affecting the image IM1, and the image IM1 has good image quality.

Although the above-described transfer medium M1 is continuous paper, the transfer medium M1 may also be cut sheet paper. In this case, the user may put the printed cut sheet paper into the adhesive tank 110 to apply the powdered adhesive 111 to the undercoat ink 36*b*. In this operation, the transfer medium M1 tilts.

When the undercoat ink 36*b* lands on the image IM1 on the transfer medium M1, it gradually dries. In the process unit region A0 of the transfer medium M1 where the adhesive 111 is applied at the same timing in the adhesive application step ST3, the later the undercoat ink 36*b* lands, the less dry the undercoat ink 36*b* is. If the transfer medium M1 tilts, for example due to application of the adhesive 111, the undercoat ink 36*b* that has not yet dried may drip downward. If the undercoat ink 36*b* drips downward, bleeding occurs in the transfer image IM1, and image quality of the transfer image IM1 deteriorates. However, if the performance of the adhesive application step ST3 is delayed in order to increase the drying time of the undercoat ink 36*b*, the throughput after the adhesive application step ST3 will decrease.

The printing device 1 in this specific example solves the above problem by relatively reducing the ejection amount of the undercoat ink 36*b* per unit area with respect to the second region A2, where the undercoat ink 36*b* is relatively late in being overlaid on the image IM1 in the above process unit region A0. First, referring to FIG. 6, a description will be provided of how the process unit region A0 is divided into regions, and examples of the undercoat ink ejection amount per unit area of each region.

The process unit region A0 includes the aforementioned regions b1 to b4. FIG. 6 shows an example in which the main scanning and the sub-scanning are performed in units of bands B1 to B6 for the region b1, which is one sheet of cut sheet paper, or for the region b2 at the time of lateral type printing. The control section 10 controls the main scanning that ejects ink 36 while moving the inkjet head 30 relative to the transfer medium M1 along the second direction D2. The control section 10 controls, by moving the colored ink head 31 in the first direction D1 relative to the transfer medium M1 in the sub-scanning between main scannings, to change a position where the colored head 32 forms the image IM1 on the transfer medium M1 in the first direction D1. In addition, the control section 10 controls, by moving the undercoat ink head 32 relative to the transfer medium M1 in the first direction D1 in the sub-scanning, to change a position in the first direction D1 where the undercoat ink head 32 overlays the undercoat ink 36*b* on the image IM1. The image IM1 is formed on the transfer medium M1 in the unit of the bands B1 to B6 in this order in the first direction D1, and the undercoat ink 36*b* is overlaid on the image IM1 in the unit of bands B1 to B6 in this order in the first direction D1. The process unit region A0 shown in FIG. 6 includes a first region A1 and a second region A2 in which the undercoat ink 36*b* is overlaid on the image IM1 after the first region A1. The second region A2 is a region where the undercoat ink 36*b* is overlaid on the image IM1 in a main scanning after a main scanning in which the undercoat ink 36*b* is overlaid on the image IM1 in the first region A1. FIG. 6 shows various examples C1 to C4 of dividing the bands B1 to B6 into regions.

In example C1, bands B1 and B2 are assigned to the first region A1, bands B3 and B4 are assigned to the third region A3, and bands B5 and B6 are assigned to the second region A2. The first region A1 includes the band B1 in which the undercoat ink 36*b* is first overlaid on the image IM1 in the process unit region A0. In the third region A3, the undercoat ink 36*b* is overlaid on the image IM1 after the first region A1 and before the second region A2. The second region A2 includes the band B6 in which the undercoat ink 36*b* is lastly overlaid on the image IM1 in the process unit region A0. The control section 10 controls the ejection amount of the undercoat ink 36*b* per unit area with respect to the first region A1 to an ejection amount DT1, controls the ejection amount of the undercoat ink 36*b* per unit area with respect to the third region A3 to an ejection amount DT3, and controls the ejection amount of the undercoat ink 36*b* per unit area with respect to the second region A2 to an ejection amount DT2. The ejection amount DT3 is less than the ejection amount DT1, and the ejection amount DT2 is less than the ejection amount DT3. The ejection amounts DT2 and DT3 may be set within a range where the effect on the image quality of the transfer image IM1 due to changes in the undercoat ink ejection amount DT is small. Note that the ejection amount of the undercoat ink 36*b* per unit area (referred to as DT) means a ratio (including percentage) of the number of dots formed by ink droplets 37 with respect to a predetermined number of pixels. In the case where dots of different sizes are formed, it means a ratio when converted into the largest dot (for example, a large dot). A pixel is the smallest component of an image to which a color can be assigned independently. For example, when Nd number of large dots are formed in 100 pixels, the ejection amount DT will be Nd %.

In the process unit region A0, the ejection amount DT2 for the second region A2, where the undercoat ink 36*b* is overlaid on the image IM1 after the first region A1, is less than the ejection amount DT1 for the first region A1, so flow of the undercoat ink 36*b*, due to tilting of the transfer medium M1 in the adhesive application step ST3, is suppressed. By suppressing the flow of the undercoat ink 36*b*, blurring of the transfer image IM1 caused by the undercoat ink 36*b* dripping downwards is suppressed, and the image quality of the transfer image IM1 is improved. Since the third region A3, where the undercoat ink ejection amount DT3 is less than the ejection amount DT1 and greater than the ejection amount DT2, is present between the first region A1 and the second region A2, the change in the undercoat ink ejection amount DT due to the change in region is reduced. By this, the effect on the image quality of the transfer image IM1 due to the change in the undercoat ink ejection amount DT is reduced, and the image quality of the transfer image IM1 is improved.

In example C2, the process unit region A0 has no third region A3, bands B1 to B4 are assigned to the first region A1, and bands B5 and B6 are assigned to the second region A2. Even if there is no third region A3, the ejection amount DT2 for the second region A2 is small, so the flow of the undercoat ink 36*b* is suppressed by tilting of the transfer medium M1 in the adhesive application step ST3, and bleeding of the transfer image IM1 is suppressed. In example C3, only the last band B6 is assigned to the second region A2, and the bands B1 to B5 are assigned to the first region A1. In the process unit region A0, the undercoat ink 36*b* flows most easily in the last band B6. Therefore, also in example C3, the flow of the undercoat ink 36*b* caused by tilting of the transfer medium M1 in the adhesive application step ST3 is effectively suppressed, and bleeding of the transfer image IM1 is effectively suppressed.

In the example C4, the undercoat ink ejection amount DT of the bands B1 to B6 are set such that the undercoat ink ejection amount DT gradually decreases from band B1 to band B6. In this case, for example, bands B1 to B5 can be assigned to the first region A1, and band B6 can be assigned to the second region A2. In example C4, the effect on the image quality of the transfer image IM1 due to the variation in the undercoat ink ejection amount DT is minimized, and the image quality of the transfer image IM1 is improved.

FIG. 7 schematically shows an example of intermittent transport of the continuous paper M11 as the transfer medium M1 used in lateral type printing. Lateral type printing for the continuous paper M11 is a printing method in which ink 36 is ejected from the inkjet head 30 while the inkjet head 30 is being scanned vertically and horizontally with respect to the process unit region A0 of the continuous paper M11 whose transport was stopped, and the continuous paper M11 is transported in the transport direction by the transport amount L1 corresponding to the process unit region A0. In the example shown in FIG. 6, the second direction D2 is the main scanning direction, and the first direction D1 is the sub-scanning direction and also the transport direction. In the adhesive application step ST3, the adhesive 111 is applied to the continuous paper M11 in units of the transport amount L1 at the same timing. Therefore, the process unit region A0 will be the region b2 that corresponds to the single transport amount L1 when the continuous paper M11 is transported intermittently.

In state SA1 shown in FIG. 7, the transport of the continuous paper M11 as transfer medium M1 is stopped, and printing is performed on a process unit region A01 as the process unit region A0. When the image IM1 is formed in the process unit region A01 and the undercoat ink 36*b* is overlaid on the image IM1, the transport section 55 transports the continuous paper M11 in the first direction D1 by a predetermined transport amount L1. The transport amount L1 is a distance obtained by adding a predetermined margin to the length of the process unit region A0 in the first direction D1. Next state SA2 is a state in which the transport of the continuous paper M11 is stopped and printing is performed in a process unit region A02 as the process unit region A0. When the image IM1 is formed in the process unit region A02 and the undercoat ink 36*b* is overlaid on the image IM1, the transport section 55 transports the continuous paper M11 in the first direction D1 by the transport amount L1. Next state SA3 is a state in which the transport of the continuous paper M11 is stopped and printing is performed in a process unit region A03 as the process unit region A0. As described above, the printer 2 forms the image IM1 in the process unit region A0 of the continuous paper M11 that was stopped, then overlays the undercoat ink 36*b* on the image IM1, and then intermittently transports the continuous paper M11 in the first direction D1 by the transport amount L1.

FIG. 8 schematically shows the process unit region A0 in a cut sheet paper M12. Printing on the cut sheet paper M12 can be performed by any of lateral type printing, serial type printing, or line type printing. FIG. 8 shows an example in which printing by lateral type or serial type is performed on the cut sheet paper M12. If the transfer medium M1 is the cut sheet paper M12, the adhesive 111 is applied to one cut sheet paper M12 at the same timing in the adhesive application step ST3. Therefore, the process unit region A0 will be the region b1 that corresponds to a single cut sheet paper.

Note that in printing in which both the main scanning and the sub-scanning are performed, the difference in the time of deposit of the undercoat ink 36*b* is greater in the sub-scanning direction than in the main scanning direction. Therefore, by changing the ejection amount of the undercoat ink 36*b* in the sub-scanning direction rather than in the main scanning direction, blurring of the transfer image IM1 is suitably suppressed.

FIG. 9 schematically shows an example of how the process unit region A0 that corresponds to the transport amount of one sub-scanning is divided into regions. When serial type printing is performed, the transfer medium M1 is transported in the transport direction by a transport amount L2 of one sub-scanning. There is a difference in the time of deposit when the undercoat ink 36*b* is deposited even in one main scanning, and the longer the distance of the main scanning is, the larger the difference in the time of deposit of the undercoat ink 36*b* will be. Therefore, it is possible to consider that a region corresponding a single transport amount L2 in the transfer medium M1 as the process unit region A0, and to divide this process unit region A0 into regions in the main scanning direction. In the example shown in FIG. 9, the main scanning direction is the first direction D1, and the sub-scanning direction is the second direction D2. The transport direction of the transfer medium M1 is a direction opposite to the second direction D2. The drive section 50 that enables serial type printing can be configured with just the main scanning drive section 51 and the transport section 55. The main scanning drive section 51 performs main scanning to eject ink 36 while moving the inkjet head 30 along the first direction D1, and the transport section 55 performs sub-scanning to transport the transfer medium M1 in a direction opposite to the second direction D2. In other words, by performing the main scanning that ejects the undercoat ink 36*b* while moving the undercoat ink head 32 relative to the transfer medium M1 along the first direction D1, the main scanning drive section 51 changes a position in the first direction D1 at which the undercoat ink 36*b* is overlaid on the image IM1. The transport section 55 moves the undercoat ink head 32 relative to the transfer medium M1 in a direction opposite to the second direction D2 in the sub-scanning between main scannings.

The serial type printing for continuous paper M11 is a printing method in which ink 36 is ejected from the inkjet head 30 while moving the inkjet head 30 along the first direction D1 for the process unit region A0 of the continuous paper M11 that is stopped in the transport, and the continuous paper M11 is transported in the transport direction by the transport amount L2. Therefore, the process unit region A0 will be the region b3 that corresponds to the transport amount L2 of one sub-scanning. The second region A2 where the process unit region A0 is divided into regions in the main scanning direction, is the region in which, in the main scanning in which the undercoat ink 36*b* is overlaid on the image IM1 on the first region A1, the undercoat ink 36*b* is overlaid on the image IM1 after the first region A1. In order to reduce waste of the transfer medium M1, in many cases, a plurality of separated images are arranged on the transfer medium M1 in the main scanning direction. Therefore, there is a time difference in deposit of the undercoat ink 36*b* that is overlaid on the image in the same main scanning. In such a case, the undercoat ink ejection amount is reduced for the second region A2, where the undercoat ink 36*b* is overlaid on the image IM1 after the first region A1, where the undercoat ink 36*b* is overlaid on the image IM1 in one main scanning. Therefore, flow of the undercoat ink 36*b* due to tilting of the transfer medium M1 in the adhesive application step ST3 is suppressed.

FIG. 9 shows various examples C1 to C4 in which the process unit region A0 corresponding to the transport amount L2 of one sub-scanning is divided into regions. In example C1, a region where the main scanning starts, which is on the left side of FIG. 9, is assigned to the first region A1, a region where the main scanning ends, which is on the right side of FIG. 9, is assigned to the second region A2, and the region between the first region A1 and the second region A2 is assigned to the third region A3. The ejection amount DT3 for the third region A3 is less than the ejection amount DT1 for the first region A1, and the ejection amount DT2 for the second region A2 is less than the ejection amount DT3 for the third region A3. In example C2, the third region A3 is not included in the process unit region A0, the region where the main scanning ends is assigned to the second region A2, and the remaining regions are assigned to the first region A1. In example C3, the second region A2 is narrower and the first region A1 is wider than in example C2. Of the process unit region A0, a part where the undercoat ink 36*b* flows most easily is the end portion of main scanning at the right side end of FIG. 9, so in example C3, the flow of the undercoat ink 36*b* due to tilting of the transfer medium M1 in the adhesive application step ST3 is also effectively suppressed. In example C4, the undercoat ink ejection amount DT for the process unit region A0 is set so that the undercoat ink ejection amount DT gradually decreases from the start portion of main scanning toward the end portion of main scanning. In example C4, the effect of the change in the undercoat ink ejection amount DT on the image quality of the transfer image IM1 is reduced. Of course, as shown in FIG. 6, it is also possible to change the undercoat ink ejection amount DT by dividing the processing unit region into regions by setting the sub-scanning direction to the first direction D1, then, as shown in FIG. 9, to change the undercoat ink ejection amount DT by dividing the divided regions by setting the main scanning direction to the first direction D1.

FIG. 10 schematically shows the process unit region A0 in a case where the continuous paper M11 is cut at a cutting position P1. The printer 2 shown in FIG. 10 performs line type printing on the continuous paper M11, but printing on the continuous paper M11 that is cut may also be performed using lateral type printing or serial type printing. When line type printing is performed, the continuous paper M11 is continuously moved in the transport direction, which is the right direction in FIG. 10. The first direction D1 where the inkjet head 30 relatively moves with respect to the continuous paper M11 is a direction opposite to the transport direction. When the continuous paper M11 on which the image IM1 was formed and the undercoat ink 36*b* was overlaid is cut, the adhesive 111 is applied on a single transfer medium M13, which is obtained from the continuous paper M11 by cutting it, at the same timing in the adhesive application step ST3. Therefore, the process unit region A0 will be the region b4 that corresponds to one cut transfer medium. In the process unit region A0, the second region A2 is located closer to the printer 2 than the first region A1. In the second region A2, the undercoat ink 36*b* is overlaid on the image IM1 after the first region A1.

3. SPECIFIC EXAMPLE OF A PROCESS OF PRINTING DEVICE

FIG. 11 schematically shows a print control process for performing control to form the image IM1 on the transfer medium M1 and to overlay the undercoat ink 36*b* on the image IM1. FIG. 11 also shows an example of the structure of a coefficient table T1 for calculating the undercoat ink ejection amount DT. The printer 2 holds the coefficient table T1 and may store the coefficient table T1 in storage section 23. The print control process shown in FIG. 11 is intended for the lateral type printing and the serial type printing. The control section 10 shown in FIG. 4 causes the print control process to start when the control section 10 receives a print instruction for the transfer medium M1 from the host device HO1 or the operation panel 24. When the print control process starts, the control section 10 acquires image data DA1 representing the transfer image IM1 from the host device HO1 or the like (step S102). Hereinafter, the word "step" may be omitted, and reference numerals of steps may be indicated in parentheses.

After acquisition of the image data DA1, the control section 10 sets a target pixel to be subjected to color conversion from among a plurality of pixels constituting the image data DA1 (S104). Next, the control section 10 converts a grayscale value of the target pixel into a value that represents a usage amount of the colored ink 36*a* and the undercoat ink 36*b* (S106). When the image data DA1 is RGB data and the ink amount data is CMYKW data that represents the usage amounts of C, M, Y, K, and W ink 36, the control section 10 converts each pixel value of R, G, and B into each pixel value of C, M, Y, K, and W by referring to a color conversion LUT. In the color conversion LUT, the grayscale value of W is a value at which the undercoat ink 36*b* is used when at least one of the colored inks 36*a* of C, M, Y, and K is used. By this, the undercoat ink 36*b* is overlaid at a location of the image IM1. The grayscale value of W after the color conversion for the target pixel represents a tentative ejection amount PD of the undercoat ink 36*b*, which is determined regardless of a position in the first direction D1 in the process unit region A0. The tentative ejection amount PD is represented by 0 to 100%, so if the grayscale value of W is between 0 to 255, the grayscale value of W will represent the tentative ejection amount PD by mapping the grayscale value 0 to 255 to the tentative ejection amount 0 to 100%.

Next, the control section 10, referring to the coefficient table T1, calculates the undercoat ink ejection amount DT by multiplying the tentative ejection amount PD of the undercoat ink 36*b* by the coefficient αi that corresponds to a region Ai included in the process unit region A0 (S108). Here, the region Ai is one of the first region A1, the second region A2, and the third region A3. The coefficient αi is a coefficient corresponding to a position in the first direction D1. The process in S108 can be said to be a process that corrects the undercoat ink data, such as W data, among the CMYK data and the ink amount data. The coefficient table T1 has a coefficient α1 associated with the first region A1, a coefficient α2 associated with the second region A2, and a coefficient α3 associated with the third region A3. FIG. 11 shows that α1=1.2, α2=0.8 and α3=1.0. In this case, the ejection amount DT1 for the first region A1 will become 1.2×PD, the ejection amount DT2 for the second region A2 will become 0.8×PD, and the ejection amount DT3 for the third region A3 will become 1.0×PD. Therefore, the ejection amount DT3 for the third region A3 is less than the ejection amount DT1 for the first region A1, and the ejection amount DT2 for the second region A2 is less than the ejection amount DT3 for the third region A3.

As described above, the control section 10 determines the tentative ejection amount PD that does not depend on the position in the first direction D1, and determines the ejection amount DT of the undercoat ink 36*b* with respect to the region Ai by multiplying the coefficient αi by the tentative ejection amount PD. By determining the ejection amount DT as αi×PD in units of region Ai, the amount of calculation can be reduced compared to a case where the ejection amount DT is linearly changed over the entire process unit region A0 in the first direction D1, and high-speed processing can be realized. After determining the ejection amount DT, the control section 10 determines whether the processes from S104 to S108 has been performed for all the pixels of the image data DA1 (S110). If there are any pixels that have not been subjected to the processes from S104 to S108, the control section 10 will return the process to S104.

When the processes from S104 to S108 have been performed for all pixels, the control section 10 performs a halftone process to generate dot data in which the number of grayscales of the obtained ink amount data is reduced to, for example, 2 or 4 (S112). The dot data is generated for each of C, M, Y, K, and W. After the halftone process, the control section 10 performs a rasterizing process to generate raster data by rearranging the dot data so that a main scanning that overlays the undercoat ink 36*b* on the image IM1 can be performed after a main scanning that forms the image IM1 (S114). For example, it is assumed that the printing section 20 performs the second main scanning in which the undercoat ink 36*b* is deposited after the first main scanning in which the colored ink 36*a* was deposited on each band in the process unit region A0. In this case, the control section 10 generates raster data by rearranging the dot data so that the colored ink 36*a* is ejected to form the image IM1 in the first main scanning and the undercoat ink 36*b* is ejected to be overlaid on the image IM1 in the second main scanning.

Finally, the control section 10 generates a drive signal SG1 according to the raster data and transmits the drive signal SG1 to the inkjet head 30, and the control section 10 controls the printing section 20 so as to form the image IM1 on the transfer medium M1 and to overlay the undercoat ink 36*b* on the image IM1 (S116). The drive section 50 moves the inkjet head 30 relative to the transfer medium M1 so that main scanning and sub-scanning are performed in accordance with the control by the control section 10. The colored ink head 31 ejects the colored ink 36*a* so that the image IM1 is formed on the transfer medium M1 during a main scanning, and the undercoat ink head 32 ejects the undercoat ink 36*b* so that the undercoat ink 36*b* is overlaid on the image IM1 during a main scanning. Here, by making the ejection amount DT2 for the second region A2, where the undercoat ink 36*b* is overlaid on the image IM1 after the first region A1 and the third region A3, less than in the first region A1 and the third region A3, the flow of the undercoat ink 36*b* due to tilting of the transfer medium M1 in the adhesive application step ST3 is suppressed. By this, bleeding of the transfer image IM1 due to the undercoat ink 36*b* dripping downward or the like is suppressed, and the image quality of the transfer image IM1 is improved. In addition, since the third region A3, which has the ejection amount DT3 that is less than the ejection amount DT1 but greater than the ejection amount DT2, is located between the first region A1 and the second region A2, the effect of the change in the undercoat ink ejection amount DT on the image quality of the transfer image IM1 is reduced, and the image quality of the transfer image IM1 is improved.

Figure 12:
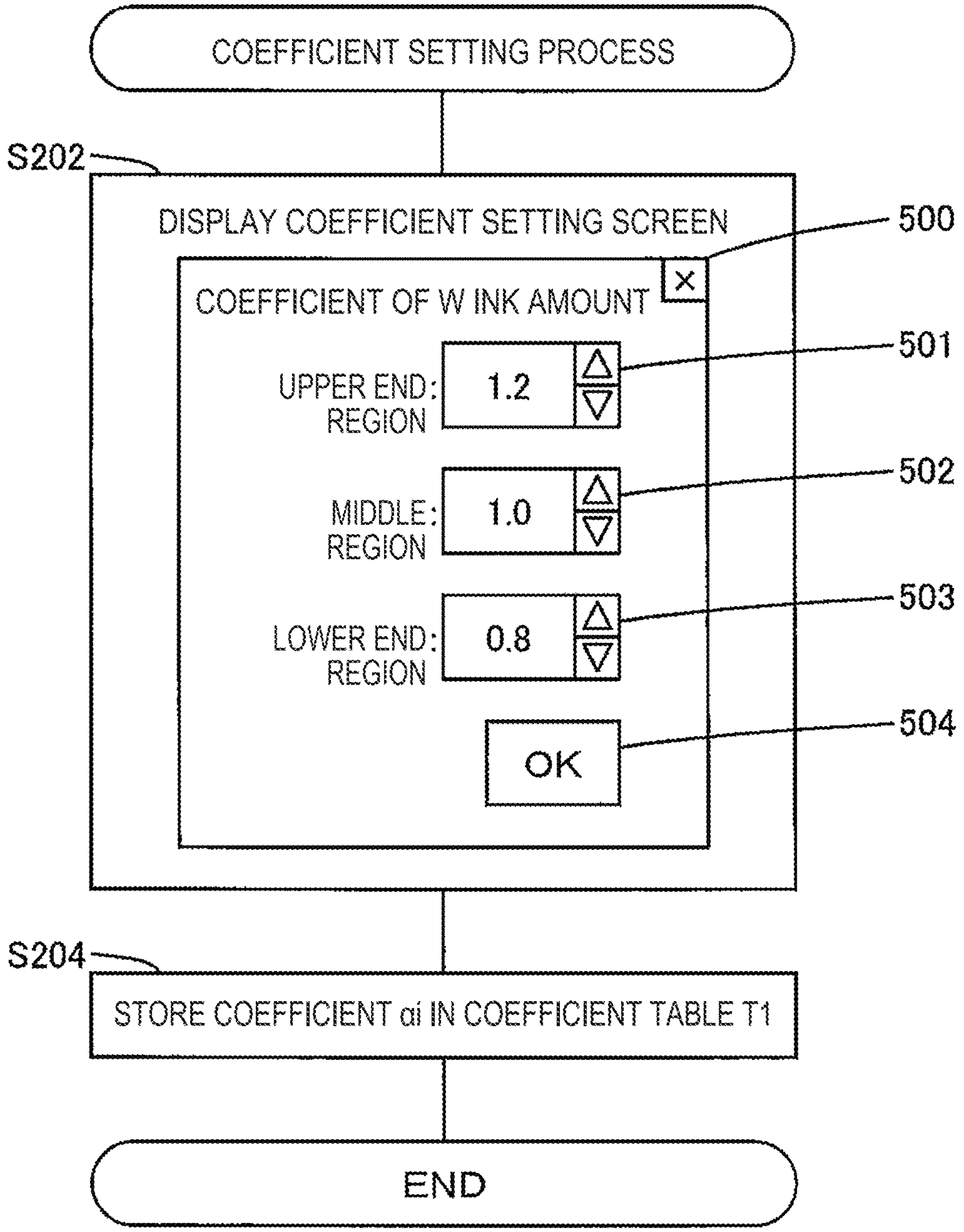
FIG. 12 is a flowchart schematically showing an example of a coefficient setting process.

As shown in FIG. 12, the printing device 1 can accept setting of the coefficient αi. FIG. 12 schematically shows the coefficient setting process. FIG. 12 also shows a coefficient setting screen 500 as a user interface screen for accepting the setting of the coefficient αi. The coefficient setting process may be performed by the printer 2, or may be performed by cooperation between the host device HO1 and the printer 2. For example, when the control section 10 of the printer 2 receives a setting instruction of coefficient αi from operation panel 24, the control section 10 starts the coefficient setting process. First, the control section 10 causes the output section 25 of the operation panel 24 to display the coefficient setting screen 500, and when the input section 26 receives an operation on the coefficient setting screen 500, the control section 10 acquires a set value corresponding to the operation from the operation panel 24 (S202). The coefficient setting screen 500 has an input field 501 for the coefficient α1, an input field 502 for the coefficient α3, an input field 503 for the coefficient α2, an OK button 504, and the like. The control section 10 displays the coefficient α1 of coefficient table T1 in the input field 501, the coefficient α3 of coefficient table T1 in the input field 502, and the coefficient α2 from coefficient table T1 in the input field 503 on the initial coefficient setting screen 500. The operation panel 24 accepts a change to the coefficient α1 in the input field 501, accepts a change to the coefficient α3 in the input field 502, and accepts a change to the coefficient α2 in the input field 502. When the operation panel 24 receives operation of the OK button 504, it transmits the coefficient α1 displayed in the input field 501, the coefficient α3 displayed in the input field 502, and the coefficient α2 displayed in the input field 503 to the control section 10.

The control section 10 stores the coefficients α1 to α3 received from the operation panel 24 in the coefficient table T1 (S204), and terminates the coefficient setting process. By this, the undercoat ink ejection amount DT is calculated according to the set coefficient αi. The host device HO1 may start the coefficient setting process in response to the setting instruction of the coefficient αi. In this case, in S202, the host device HO1 acquires the coefficient αi from the printer 2, displays the coefficient setting screen 500 on the display, and accepts an operation to the coefficient setting screen 500 by an input device such as a keyboard, a pointing device, a touch panel, or the like. When the host device HO1 receives the operation of the OK button 504, it transmits the coefficients αi displayed in the input fields 501 to 503 to the printer 2 in S204. The printer 2 that has received the coefficients αi may store the coefficients αi in the coefficient table T1.

By performing the coefficient setting process above, the undercoat ink ejection amount DT can be adjusted according to the user's request. Whether the transfer image IM1 will have the intended image quality is affected by an amount and composition of the colored ink 36*a*, an amount and composition of the adhesive 111, and the like, in addition to an amount and composition of the undercoat ink 36*b*. Therefore, strictly speaking, the coefficient αi must be determined by considering an enormous number of possible combinations, such as the amount and composition of ink 36, the type of transfer medium M1, the amount and type of adhesive 111, the type of transfer target medium M2. By performing the coefficient setting process above, it is not necessary to prepare coefficients αi for all the possible combinations, and the storage space for the coefficients αi can be reduced.

Note that as shown in FIG. 13, the ejection amount DT1 of the undercoat ink 36*b* that is overlaid on the image IM1 in the first region A1 is not limited to being constant, and the ejection amount DT2 of the undercoat ink 36*b* that is overlaid on the image IM1 in the second region A2 is also not limited to being constant. FIG. 13 schematically shows an example in which the undercoat ink ejection amount DT is changed according to the size of a continuous region of the image IM1 within the same area.

The first region A1 shown in FIG. 13 includes a first continuous region A11 that is connected as a single image IM1 in the first region A1, and a second continuous region A12 that is connected as a single image IM1 in the first region A1 and that is separated from the first continuous region A11. The second continuous region A12 has the larger area than the first continuous region A11. In the same first region A1, the larger the continuous region is, the more easily that flow of the undercoat ink 36*b* occurs due to tilting of the transfer medium M1 in the adhesive application step ST3. Therefore, the control section 10 may reduce the ejection amount DT12 of the undercoat ink 36*b* per unit area for the second continuous region A12 compared to the ejection amount DT11 of the undercoat ink 36*b* per unit area for the first continuous region A11. By this, the flow of the undercoat ink 36*b* due to tilting of the transfer medium M1 in the adhesive application step ST3 is further suppressed.

The second region A2 shown in FIG. 13 includes a first continuous region A11 that is connected as a single image IM1 in the second region A2, and a second continuous region A12 that is connected as a single image IM1 in the second region A2 and is separated from the first continuous region A11. The second continuous region A12 has the larger area than the first continuous region A11. In the same second region A2, the larger the continuous region is, the more easily that flow of the undercoat ink 36*b* occurs due to tilting of the transfer medium M1 in the adhesive application step ST3. In particular, in the second region A2, a drying time of the undercoat ink 36*b* is short, so it is likely that the undercoat ink 36*b* flows in the relatively large second continuous region A12. Therefore, the control section 10 may reduce the ejection amount DT22 of the undercoat ink 36*b* per unit area for the second continuous region A12 compared to the ejection amount DT21 of the undercoat ink 36*b* per unit area for the first continuous region A11. By this, the flow of the undercoat ink 36*b* due to tilting of the transfer medium M1 in the adhesive application step ST3 is further suppressed.

Note that while DT21>DT22 in the second region A2, DT11=DT12 is possible in the first region A1, and while DT11>DT12 in the first region A1, DT21=DT22 is possible in the second region A2. Even in a case where the third region A3 includes a first continuous region A11, which has a small area, and a second continuous region A12, which has a large area, the undercoat ink ejection amount per unit area for the second continuous region A12 may be less than the undercoat ink ejection amount per unit area for the first continuous region A11.

FIG. 14 schematically shows the structure of the coefficient table T1 for changing the undercoat ink ejection amount DT according to the size of the continuous region of the image IM1 within the same region. The coefficient table T1 shown in FIG. 14 has a coefficient α1 associated with the first region A1, a coefficient α2 associated with the second region A2, and a coefficient α3 associated with the third region A3. The coefficient αi changes according to the area of the continuous region. As shown in FIG. 14, the coefficient αi 14 is smaller for the second continuous region A12, where the area of the continuous region is equal to or greater than the threshold THA, than for the first continuous region A11, where the area of the continuous region is less than the threshold THA. For example, in the second region A2, the coefficient αi in the first continuous region A11 is 0.8, and the coefficient αi in the second continuous region A12 is 0.7. Note that the coefficient αi within the same region may be switched to three or more levels or may be changed linearly.

The print control process that refers to the coefficient table T1 shown in FIG. 14 can be performed according to the print control process shown in FIG. 11. For example, in S102, the control section 10, based on the image data DA1, may extract a continuous region included in first region A1, may extract a continuous region included in second region A2, and may extract a continuous region included in third region A3. Then, the control section 10 may obtain the area of each continuous region by S108. The area of a continuous region can be obtained, for example, by counting the number of pixels included in the continuous region. In each region Ai, the control section 10 determines that the continuous region is the first continuous region A11 if the area of the continuous region is less than the threshold THA, and determines that the continuous region is the second continuous region A12 if the area of the continuous region is equal to or greater than the threshold THA. In S108, the control section 10 may calculate, by referring to a coefficient αi corresponding to the area of the continuous region in region Ai from the coefficient table T1, the undercoat ink ejection amount DT by multiplying the tentative ejection amount PD of the undercoat ink 36*b* by the coefficient αi. When referring the coefficient table T1 shown in FIG. 14, the control section 10 applies the coefficient αi corresponding to a value less than the threshold THA to the first continuous region A11, and applies the coefficient αi corresponding to a value equal to or greater than the threshold THA to the second continuous region A12. By performing the print control process in this way, the flow of the undercoat ink 36*b* due to tilting of the transfer medium M1 in the adhesive application step ST3 is further suppressed, and bleeding of the transfer image is further suppressed.

As shown in FIG. 15, the number of passes NP in the process unit region A0 is not limited to being constant, buy may be changed according to the region. Here, the number of passes NP means the number of times that the main scanning that accompanies ejection of the undercoat ink 36*b* is performed in the same portion on the transfer medium M1. FIG. 15 schematically shows an example in which the number of passes NP is changed according to the undercoat ink ejection amount DT per unit area. FIG. 15 also shows an example of the structure of a number of passes table T2 for determining the number of passes NP according to the undercoat ink ejection amount DT. The number of passes table T2 is used when the main scanning and the sub-scanning are performed. As shown in FIG. 15, the number of passes table T2 defines the relationship between the undercoat ink ejection amount DT and the number of passes NP. In the number of passes table T2, the number of passes NP increases stepwise as the ejection amount of W as the undercoat ink ejection amount DT increases.

The process unit region A0 shown in FIG. 15 includes a first ejection amount region AD1 in which the undercoat ink ejection amount DT per unit area is 40% as the first ejection amount, and a second ejection amount region AD2 in which the undercoat ink ejection amount DT per unit area is 80% as the second ejection amount. Here, the second ejection amount is larger in the undercoat ink ejection amount DT than the first ejection amount, and the second ejection amount region AD2 is located in a different position in the first direction D1 from the first ejection amount region AD1. As shown in FIG. 15, the second region A2 is an example of the first ejection amount region AD1, and the first region A1 is an example of the second ejection amount region AD2. Note that when the second region A2 corresponds to the first ejection amount region AD1, the third region A3 may correspond to the second ejection amount region AD2, or when the third region A3 corresponds to the first ejection amount region AD1, the first region A1 may correspond to the second ejection amount region AD2. The control section 10 sets the number of passes NP in the second ejection amount region AD2 to be greater than the number of passes NP in the first ejection amount region AD1.

For example, when the undercoat ink ejection amount DT of the first ejection amount region AD1 is 40%, the control section 10 sets the number of passes NP to 4 according to the number of passes table T2. When the undercoat ink ejection amount DT of the second ejection amount region AD2 is 80%, the control section 10 sets the number of passes NP to 8 according to the number of passes table T2. As shown in FIG. 15, the number of passes NP in a third ejection amount region, for example, the third region A3, where the ejection amount DT is greater than that in the first ejection amount region AD1 and the ejection amount DT is less than that in the second ejection amount region AD2, may be greater than the number of passes NP in the first ejection amount region AD1 and may be less than the number of passes NP in the second ejection amount region AD2.

The print control process that refers to the number of passes table T2 can be performed according to the print control process shown in FIG. 11. For example, in S112, the control section 10 calculates, based on the W data included in the CMYK data, an average value of the ejection amount of the undercoat ink 36*b* to be overlaid on the image IM1 for each region Ai, and then refers to the number of passes table T2 using the calculated average value as the undercoat ink ejection amount DT. Then, the control section 10 sets the number of passes NP corresponding to the undercoat ink ejection amount DT for each region Ai, and generates dot data in which the grayscale levels of the ink amount data are reduced to, for example, 2 or 4. In the region where the undercoat ink ejection amount DT is high, drying of the undercoat ink 36*b* progresses as the number of passes NP increases. Therefore, flow of the undercoat ink 36*b* due to tilting of the transfer medium M1 in the adhesive application step ST3 is further suppressed.

Note that if the main scanning can be stopped during a band, it is possible to change the number of times of the main scanning within the band. In a case where the first ejection amount region AD1 and the second ejection amount region AD2 are set in one band such that the first region A1 and the second region A2 are set in one band, the control section 10 may set the number of times of the main scanning in the second ejection amount region AD2 to be greater than the number of times of the main scanning in the first ejection amount region AD1. In a region where the undercoat ink ejection amount DT is large, drying of the undercoat ink 36*b* progresses due to an increase in the number of times of the main scanning, so the flow of the undercoat ink 36*b* by tilting of the transfer medium M1 in the adhesive application step ST3 is further suppressed.

4. MODIFIED EXAMPLE

Various modifications of the present disclosure are conceivable. For example, a subject that performs the above processes is not limited to a CPU, and may be an electronic component other than a CPU, such as an application specific integrated circuit (ASIC). Of course, a plurality of CPUs may work together to perform the above processes, or a CPU and another electronic component (for example, an ASIC) may work together to perform the above processes. A part of the print control process shown in FIG. 11 may be performed by the host device HO1. In this case, in a narrow sense the control section of the printing device 1 is a combination of the control section 10 and the host device HO1. The combination of colors of colored ink 36*a* is not limited to C, M, Y, and K, and may include orange, green, light cyan having a low density than C, light magenta having a low density than M, dark yellow having a higher density than Y, light black having a low density than K, and the like. Of course, the aspects of the present application are also applicable to the case where the colored ink 36*a* does not include some of the colors of C, M, Y, and K.

The undercoat ink 36*b* is not limited to the W ink, and may be K ink containing a component that absorbs light, gray ink containing a component that causes diffuse reflection and a component that absorbs light, or the like. It is also possible to use clear ink, which allows light to pass through, as the undercoat ink 36*b*, although the color of the transfer target medium M2 that serves as the background for the image IM1 may pass through. Although FIGS. 13 and 14 show examples in which the undercoat ink ejection amount DT is changed according to the size of the continuous region of image IM1 in the same area, the control section 10 may change the undercoat ink ejection amount DT according to the color of image IM1 in the same area.

Although the above print control process shows an example in which the undercoat ink ejection amount DT is changed for each region Ai by adjusting the ink amount data of the undercoat ink 36*b*, it is also possible to change the undercoat ink ejection amount DT for each region Ai using other than this example. For example, the control section 10 may generate CMYK data that does not include W data from the RGB data, generate colored dot data of each of C, M, Y, and K from the CMYK data, and then generate four level W dot data based on the colored dot data. Here, the control section 10 may generate W dot data in which a large W dot occurs in a pixel where a colored ink 36*a* dot occurs in the first region A1, and generate W dot data in which a medium W dot occurs in a pixel where a colored ink 36*a* dot occurs in the second region A2. By this, it is possible to reduce the undercoat ink ejection amount DT in the second region A2 compared to that of the first region A1. In addition, the control section 10 may, by applying a data mask that reduces the occurrence rate of W dots in the second region A2, reduce the undercoat ink ejection amount DT in the second region A2 compared to the first region A1.

5. CONCLUSION

As described above, according to the present disclosure, it is possible to provide a configuration that can suppress bleeding of the transfer image in various aspects. Of course, the basic operations and effects described above can also be obtained with an aspect consisting only of the independent claim's constituent elements. A configuration in which the respective configurations disclosed in the above-described examples are replaced with each other or combinations thereof are changed, a configuration in which the respective configurations disclosed in the publicly known art and the above-described examples are replaced with each other or combinations thereof are changed, and the like can be implemented. The present disclosure also includes these configurations.

What is claimed is:

1. A printing method for printing on a transfer medium in order to perform an adhesive application step for applying an adhesive on undercoat ink that was overlaid on an image that was formed on the transfer medium, and to perform a transfer step for transferring the image to a transfer target medium by attaching the adhesive to the transfer target medium, the printing method comprising:

an image forming step that forms the image on the transfer medium by ejecting colored ink from a first inkjet head; and an undercoat forming step in which the undercoat ink is overlaid on the image on the transfer medium by ejecting the undercoat ink from a second inkjet head, wherein assuming that a region where the adhesive is applied to the transfer medium at the same timing in the adhesive application step is a process unit region, the process unit region includes a first region and a second region where the undercoat ink is overlaid on the image after the first region and in the undercoat forming step, an ejection amount of the undercoat ink per unit area to the second region is less than an ejection amount of the undercoat ink per unit area to the first region.

2. The printing method according to claim 1, wherein the first region includes a portion where the undercoat ink is first overlaid on the image in the process unit region and the second region includes a portion where the undercoat ink is lastly overlaid on the image in the process unit region.

3. The printing method according to claim 1, wherein at least one of the first region and the second region includes a first continuous region that is connected as one image in the region, and a second continuous region that is separated from the first continuous region and is connected as one image in the region, the second continuous region is larger in area than the first continuous region, and in the undercoat forming step, an ejection amount of the undercoat ink per unit area with respect to the second continuous region is set to be less than an ejection amount of the undercoat ink per unit area with respect to the first continuous region.

4. The printing method according to claim 1, wherein in the undercoat forming step, a main scanning is performed that ejects the undercoat ink while moving the second inkjet head relative to the transfer medium along a second direction that intersects a first direction in which the transfer medium is moved relative to the second inkjet head and a position in the first direction where the undercoat ink is overlaid on the image is changed by moving the second inkjet head relative to the transfer medium in the first direction during a sub-scanning between main scannings and the second region is a region where the undercoat ink is overlaid on the image in the main scanning that is later than the main scanning where the undercoat ink is overlaid on the image in the first region.

5. The printing method according to claim 1, wherein in the undercoat forming step, a main scanning is performed that ejects the undercoat ink while moving the second inkjet head relative to the transfer medium in the first direction and the second region is, in the main scanning where the undercoat ink is overlaid on the image in the first region, a region where the undercoat ink is overlaid on the image after the first region.

6. The printing method according to claim 1, wherein in the undercoat forming step, a tentative ejection amount of the undercoat ink is determined regardless of a position in the first direction in the process unit region, and the ejection amount of the undercoat ink with respect to the first region and the second region is determined by multiplying the tentative ejection amount by a coefficient corresponding to the position in the first direction.

7. The printing method according to claim 1, wherein the undercoat ink is an ink that contains a component that blocks transmission of light.

8. The printing method according to claim 1, wherein in the undercoat forming step, a main scanning is performed that ejects the undercoat ink while moving the second inkjet head relative to the transfer medium along a second direction that intersects the first direction, and a position in the first direction where the undercoat ink is overlaid on the image is changed by moving the second inkjet head in the first direction relative to the transfer medium during a sub-scanning between main scannings, the process unit region includes a first ejection amount region where the ejection amount per unit area of the undercoat ink that is overlaid on the image is a first ejection amount, and a second ejection amount region where the ejection amount per unit area of the undercoat ink that is overlaid on the image is a second ejection amount that is greater than the first ejection amount, the second ejection amount region is located at a different position from the first ejection amount region in the first direction, and assuming that the number of times that the main scanning that accompanies an ejection of the undercoat ink is performed on the same portion of the transfer medium is the number of passes, in the undercoat forming step, the number of passes in the second ejection amount region is greater than the number of passes in the first ejection amount region.

9. A printing device that prints on a transfer medium in order to perform an adhesive application step that applies an adhesive on undercoat ink that was overlaid on an image that was formed on the transfer medium, and a transfer step that transfers the image to a transfer target medium by attaching the adhesive to the transfer target medium, the printing device comprising:

a first inkjet head that ejects colored ink;

a second inkjet head that ejects the undercoat ink;

a drive section configured to move the second inkjet head in a first direction relative to the transfer medium; and a control section that controls ejection of the colored ink from the first inkjet head, ejection of the undercoat ink from the second inkjet head, and the drive section, wherein the control section performs control to form the image on the transfer medium with the colored ink ejected from the first inkjet head, and to overlay the undercoat ink ejected from the second inkjet head on the image, assuming that a region where the adhesive is applied to the transfer medium at the same timing in the adhesive application step is a process unit region, the process unit region includes a first region and a second region where the undercoat ink is overlaid on the image after the first region, and the control section causes the ejection amount of the undercoat ink per unit area with respect to the second region to be less than the ejection amount of the undercoat ink per unit area with respect to the first region.

* * * * *